(12) United States Patent
Long et al.

(10) Patent No.: US 12,493,338 B1
(45) Date of Patent: Dec. 9, 2025

(54) INTEGRATED CIRCUIT POWER CONTROL

(71) Applicant: Auradine, Inc., Santa Clara, CA (US)

(72) Inventors: Marshall Long, Sugarland, TX (US);
Sridhar Chirravuri, Sunnyvale, CA (US); Zhenqiang Ye, Tracy, CA (US);
Sairam Jalakam Devarajulu, San Jose, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 19/075,656

(22) Filed: Mar. 10, 2025

(51) Int. Cl.
*G06F 1/32* (2019.01)
*G06F 1/3206* (2019.01)
*G06F 1/3234* (2019.01)
*G06F 1/3287* (2019.01)

(52) U.S. Cl.
CPC .......... *G06F 1/3206* (2013.01); *G06F 1/3243* (2013.01); *G06F 1/3287* (2013.01)

(58) Field of Classification Search
CPC ..... G06F 1/3206; G06F 1/3243; G06F 1/3287
See application file for complete search history.

(56) References Cited

U.S. PATENT DOCUMENTS

| 12,243,827 | B1 | 3/2025 | Liu et al. |
| 12,314,764 | B1 | 5/2025 | Long |
| 12,341,514 | B1 | 6/2025 | Ilislamoo et al. |
| 2003/0065961 | A1* | 4/2003 | Koenen ................. G06F 1/3203 713/323 |
| 2010/0082414 | A1 | 4/2010 | Shimaya |
| 2010/0205469 | A1* | 8/2010 | Mccarthy ............. G06F 9/5061 713/324 |
| 2013/0346764 | A1 | 12/2013 | Gullbrand et al. |
| 2017/0177070 | A1 | 6/2017 | Williams et al. |
| 2018/0356875 | A1* | 12/2018 | Zhang ..................... G06F 1/324 |
| 2021/0405722 | A1 | 12/2021 | Sadowski et al. |
| 2023/0229210 | A1 | 7/2023 | Lewis et al. |

* cited by examiner

*Primary Examiner* — Stefan Stoynov
(74) *Attorney, Agent, or Firm* — Fish & Richardson P.C.

(57) ABSTRACT

A system includes a plurality of computing devices. Each of the plurality of computing devices includes a plurality of integrated circuit (IC) chips configured to perform a common type of computation in parallel with one another. At least one of the plurality of computing devices is configured to: receive, from an asset management server, an event data providing target values for one or more parameters to schedule a power event; store the event data in a storage coupled to the computing device; monitor one or more current values for the one or more parameters; and, based on determining that the current values for the one or more parameters have reached the target values, switch one or more of the plurality of IC chips corresponding to the computing device from a first power mode to a second power mode.

20 Claims, 20 Drawing Sheets

INTEGRATED CIRCUIT POWER CONTROL

FIELD OF THE DISCLOSURE

This specification generally relates to power control for integrated circuit (IC) chips.

BACKGROUND

A large number of hardware assets (e.g., computers that perform computation tasks for cryptographic operations, such as mining cryptocurrencies, or for large language models, among other applications) can be aggregated together and managed in a common system.

SUMMARY

Some aspects of this disclosure relate to a system for controlling power events of computing devices that each include integrated circuit (IC) chips configured to perform a common type of computation in parallel with one another.

Some aspects of this disclosure describe a system including a plurality of computing devices. Each of the plurality of computing devices includes a plurality of integrated circuit (IC) chips configured to perform a common type of computation in parallel with one another. At least one of the plurality of computing devices is configured to: receive, from an asset management server, an event data providing target values for one or more parameters to schedule a power event; store the event data in a storage coupled to the computing device; monitor one or more current values for the one or more parameters; and, based on determining that the current values for the one or more parameters have reached the target values, switch one or more of the plurality of IC chips corresponding to the computing device from a first power mode to a second power mode.

This and other systems described herein can have one or more of at least the following characteristics.

In some implementations, the target values of the one or more parameters include a target time of the power event and a time interval, and the at least one computing device is configured to initiate the switch from the first power mode to the second power mode by: determining a random time within a time range, wherein the time range is based on the target time and the time interval; determining that a current time has reached the target time of the power event; and, based on the current time reaching the target time, switching from the first power mode to the second power mode at the random time.

In some implementations, the at least one of the plurality of computing devices includes multiple computing devices, and the multiple computing devices are configured to determine respective random times that are different from one another.

In some implementations, determining that the current time has reached the target time includes determining that the current time is the time interval before the target time, and the random time within the time range is before the target time.

In some implementations, the random time within the time range is after the target time.

In some implementations, the target values of the one or more parameters include a start time of the power event and an end time of the power event. The end time is after the start time. The at least one computing device is configured to: initiate the switch from the first power mode to the second power mode based on a current time reaching the start time, and initiate a switch from the second power mode to the first power mode based on the current time reaching the end time.

In some implementations, the target values of the one or more parameters include a target energy price, and the at least one computing device is configured to initiate the switch from the first power mode to the second power mode by: monitoring an energy price; determining that the energy price has reached the target energy price; and based on determining that the energy price has reached the target energy price, switching from the first power mode to the second power mode.

In some implementations, the system includes the asset management server. The asset management server is configured to control operations of the plurality of computing devices. The asset management server is configured to: receive a request to schedule the power event, wherein the request provides the target values for the one or more parameters, and, based on the request, generate the event data and send the event data to the at least one computing device.

In some implementations, the target values of the one or more parameters include a target energy price. The asset management server is configured to: monitor an energy price; determine that the energy price has reached the target energy price; and, in response to determining that the energy price has reached the target energy price, generate the event data and send the event data to the at least one computing device.

In some implementations, wherein the request provides a condition for switching the at least one computing device from the first power mode to the second power mode. The event data provides a first end time at which the at least one computing device is to switch from the second power mode to the first power mode. The asset management server is configured to: at a time after the event data is sent to the at least one computing device, and before the first end time, determine that the condition remains satisfied; and, based on determining that the condition remains satisfied, send an update to the at least one computing device, the update configured to change the first end time to a second end time that is after the first end time.

In some implementations, the asset management server is configured to: receive, from a user device, a designation of a third-party entity as permitted to control the at least one computing device; and, in response to receiving the request, authenticate whether the request is received from the third-party entity. Generating the event data and sending the event data to the at least one computing device is in response to authenticating that the request is received from the third-party entity.

In some implementations, in the first power mode, the common type of computation is enabled, and, in the second power mode, the common type of computation is disabled.

In some implementations, in the second power mode, a communication function of the computing device is enabled. The communication function is configured to provide communication between the computing device and the asset management server.

In some implementations, the first power mode corresponds to a power-on state and the second power mode corresponds to a power-off state, and switching from the first power mode to the second power mode includes switching the one or more IC chips of the computing device from the power-on state to the power-off state.

In some implementations, the common type of computation includes a cryptocurrency mining computation or a machine learning computation.

Some aspects of this disclosure describe a method that includes: controlling a plurality of integrated circuit (IC) chips of a computing device to, in a first power mode, perform a common type of computation in parallel with one another; receiving, at the computing device, an event data providing target values for one or more parameters to schedule a power event, wherein the event data is received from an asset management server or from a user device; storing the event data in a storage coupled to the computing device; monitoring, by the computing device, current values for the one or more parameters; and, based on determining that the current values for the one or more parameters have reached the target values, switching one or more of the plurality of IC chips corresponding to the computing device from the first power mode to a second power mode. Switching the one or more IC chips from the first power mode to the second power mode includes terminating performance of the common type of computation by the one or more IC chips.

In some implementations, the target values of the one or more parameters include a target time of the power event and a time interval, and the method includes initiating the switch from the first power mode to the second power mode by: determining a random time within a time range, wherein the time range is based on the target time and the time interval; determining that a current time has reached the target time of the power event; and, based on the current time reaching the target time, switching from the first power mode to the second power mode at the random time.

Some aspects of this disclosure describe a system that includes a plurality of computing devices. Each of the plurality of computing devices includes a plurality of integrated circuit (IC) chips configured to perform a common type of computation in parallel with one another. The system includes an asset management server configured to control operations of the plurality of computing devices. The asset management server is configured to: receive a request to schedule a power event, wherein the request provides target values for one or more parameters, and, based on the request, generate event data and send the event data to at least one of the plurality of computing devices. The at least one computing device is configured to: receive the event data from the asset management server, store the event data in a storage couple to the computing device, and, based on determining that current values for the one or more parameters have reached the target values, switch one or more of the plurality of IC chips corresponding to the computing device from a first power mode to a second power mode.

In some implementations, the target values include a target time for the power event, the request provides the target time, and the at least one computing device is configured to: monitor a current time, and switch the one or more of the plurality of IC chips from the first power mode to the second power mode in response to the current time reaching the target time.

In some implementations, the target values include a target energy price, and the asset management server is configured to: monitor an energy price; determine that the energy price has reached the target energy price; and, in response to determining that the energy price has reached the target energy price, generate the event data and send the event data to the at least one computing device.

Some aspects of the present disclosure describe a system including a plurality of computing devices. Each of the plurality of computing devices includes a plurality of integrated circuit (IC) chips configured to perform a common type of computation in parallel with one another. At least one of the plurality of computing devices is configured to: receive event data providing a target time of a power event, and a time interval; determine a random time within a time range, wherein the time range is based on the target time and the time interval; determine that a current time has reached the target time; and, based on determining that the current time has reached the target time, switch one or more of the plurality of IC chips corresponding to the computing device from a first power mode to a second power mode at the random time.

This and other systems described herein can have one or more of at least the following characteristics.

In some implementations, determining the random time includes: generating a random number at the computing device; and determining the random time based on the random number.

In some implementations, the at least one of the plurality of computing devices includes multiple computing devices, and the multiple computing devices are configured to determine respective random times that are different from one another.

In some implementations, determining that the current time has reached the target time includes determining that the current time is the time interval before the target time, and the random time within the time range is before the target time.

In some implementations, the random time within the time range is after the target time.

In some implementations, the time interval is in a range from 30 seconds to 900 seconds.

In some implementations, in the first power mode, the common type of computation is enabled, and, in the second power mode, the common type of computation is disabled.

In some implementations, the at least one computing device is configured to receive the event data from an asset management server communicatively coupled to the plurality of computing devices.

In some implementations, the common type of computation includes a cryptocurrency mining computation or a machine learning computation.

Some aspects of the present disclosure describe a method that includes: receiving, at a plurality of computing devices, event data providing a target time of a power event, and a time interval. Each of the plurality of computing includes comprises a plurality of integrated circuit (IC) chips configured to perform a common type of computation in parallel with one another. The method includes independently determining, by each of the plurality of computing devices, a respective random time within a time range. The time range is based on the target time and the time interval. The method includes determining, by each of the plurality of computing devices, that a current time has reached the target time. The method includes, based on determining that the current time has reached the target time, switching one or more of the plurality of IC chips corresponding to each of the plurality of computing devices from a first power mode to a second power mode at the respective random time corresponding to the computing device.

This and other methods described herein can have one or more of at least the following characteristics.

In some implementations, independently determining the random time includes: generating a random number at the computing device; and determining the respective random time corresponding to the computing device based on the random number.

In some implementations, the respective random times determined by the plurality of computing devices are different from one another.

In some implementations, the target time is a start time of the time range or an end time of the time range.

In some implementations, determining that the current time has reached the target time includes determining that the current time is the time interval before the target time. The respective random time within the time range is before the target time.

In some implementations, the random time within the time range is after the target time.

In some implementations, the time interval is in a range from 30 seconds to 900 seconds.

In some implementations, in the first power mode, the common type of computation is enabled, and, in the second power mode, the common type of computation is disabled.

Some aspects of the present disclosure describe a computing device that includes: a substrate; a plurality of integrated circuit (IC) chips on the substrate; and a controller. The controller is configured to: control the plurality of integrated circuit (IC) chips to, in a first power mode, perform a common type of computation in parallel with one another; receive event data providing a target time of a power event, and a time interval; determine a random time within a time range, wherein the time range is based on the target time and the time interval; determine that a current time has reached the target time; and, based on determining that the current time has reached the target time, switch one or more of the plurality of IC chips from the first power mode to a second power mode at the random time. Switching the one or more of the plurality of IC chips from the first power mode to the second power mode includes terminating performance of the common type of computation by the one or more IC chips.

DETAILED DESCRIPTION

In distributed computing tasks such as cryptocurrency mining or parallel computations for artificial intelligence (AI) tasks such as generative AI operations, asset management can be important for maintaining both operational efficiency and grid stability. For example, power consumption can be managed in response to grid demand (e.g., electricity price) fluctuations. However, traditional methods for executing asset management may lack the flexibility to handle desired control results while mitigating power surges. These traditional methods may be unresponsive to user inputs, incapable of conforming to target behavior profiles, and/or otherwise inflexible in a manner that risks overloading grids during peak demand times, damaging computing devices, and failing to achieve desired results.

The present application describes technologies for improving control of computing devices that include multiple integrated circuit (IC) chips configured to compute in parallel to one another. Based on the joint operations of user devices, asset management servers, and/or computing devices as described herein, power events for the computing devices can be scheduled in advance to facilitate more efficient, more flexible control and operation, in a manner compatible with phased power events.

Figure 1:
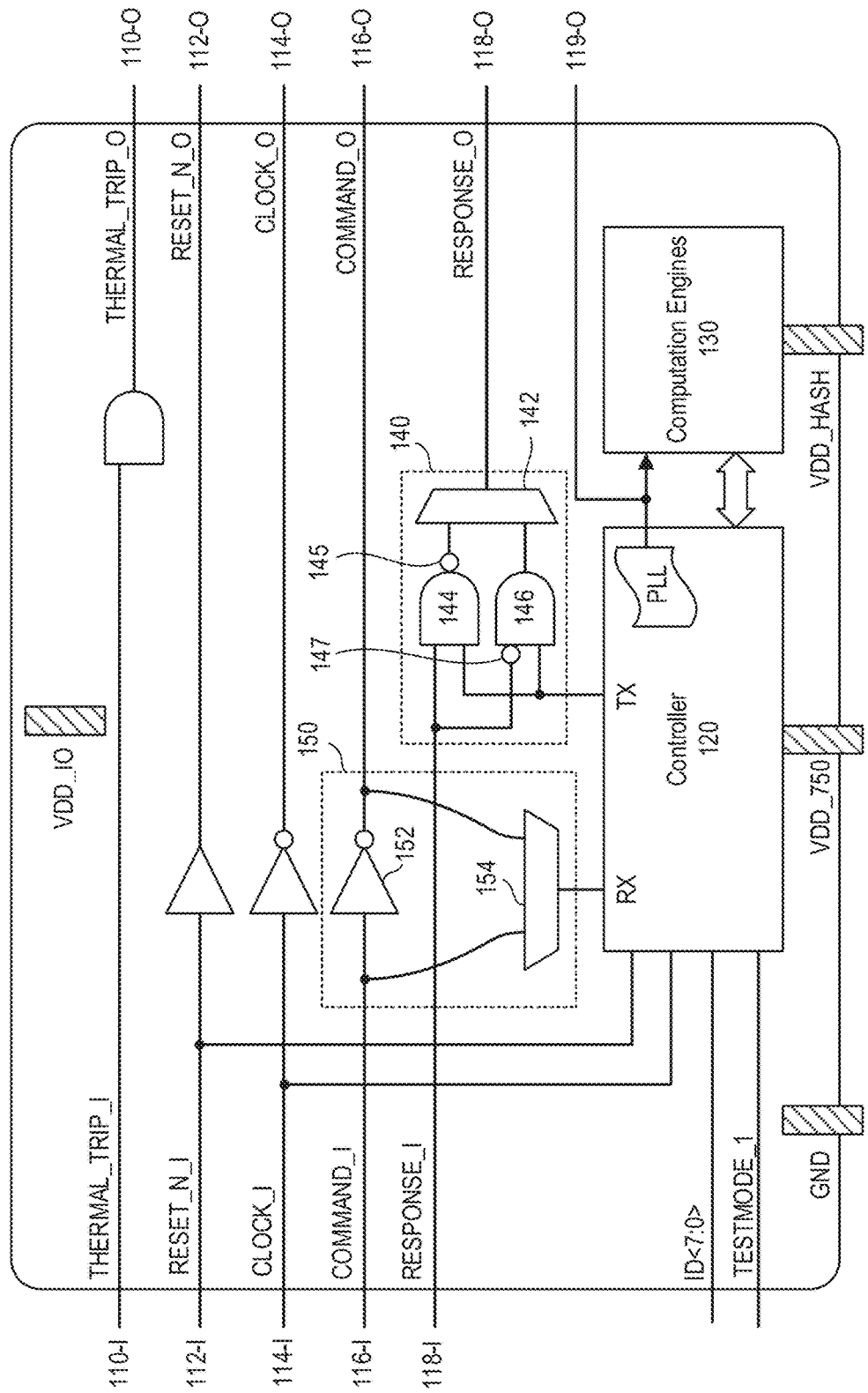
FIG. 1 is a diagram illustrating an example of an IC chip.

FIG. 1 shows a schematic diagram of an example of an integrated circuit (IC) chip 100. The IC chip 100 can be, for example, an application-specific integrated circuit (ASIC). The IC chip 100 can be of any one or more suitable types in various implementations, such as a general-purpose processor chip, a field-programmable gate array (FPGA) chip, etc.

As shown, IC chip 100 includes multiple pairs of input and output terminals coupled to multiple buses. For example, IC chip 100 includes input terminal 118-I and output terminal 118-O coupled to a response (RSP) bus 118, input terminal 116-I and output terminal 116-O coupled to a command (CMD) bus 116, input terminal 114-I and output terminal 114-O coupled to a clock (CLK) bus 114, input terminal 112-I and output terminal 112-O coupled to a reset (RSTN) bus 112, and input terminal 110-I and output terminal 110-O coupled to a thermal trip (TMTP) bus 110.

IC chip 100 further includes a circuit 140 for processing signals on the response bus 118. Circuit 140 is configured to receive an input signal at input terminal 118-I on the response bus 118, combine the input signal with a signal sent by controller 120 to generate a combined signal, and transmit the combined signal on the response bus 118 by using output terminal 118-O. Based on this configuration, multiple of the IC chips 100 can be connected in series to one another to transfer their outputs together as a combined output.

In the shown example, circuit 140 includes a multiplexer 142, two AND gates 144 and 146, and two inverters 145 and 147. Multiplexer 142 is a circuit or a device that can be used to select one out of several input signals based on a control signal and route the selected input signal to an output. Each one of AND gates 144 and 146 is a circuit or a device that performs a logical conjunction operation. Each one of inverters 145 and 147 is a circuit or a device that performs a logical operation on its input signal and produces the logical complement (inverse) of the input at its output. As shown, an input terminal of inverter 145 is coupled to an output terminal of AND gate 144, and an output terminal of inverter 145 is coupled to an input terminal of multiplexer 142. An input terminal of AND gate 146 is coupled to an output terminal of inverter 147, and an output terminal of AND gate 146 is coupled to an input terminal of multiplexer 142.

In the shown example, multiplexer 142 can be configured to select, based on a control signal, one of two input signals including a first input signal that is received as an output signal of inverter 145 and a second input signal that is received as an output signal of AND gate 146, and transmit the selected input signal on the response bus 118.

IC chip 100 further includes a circuit 150 for processing signals on the command bus 116. Circuit 150 is configured to receive an input signal on the command bus 116 using input terminal 116-I, invert the input signal to generate an inverted signal, and transmit the inverted signal as an output signal on the command bus 116 using output terminal 116-O. In some implementations, circuit 150 is further configured to conditionally forward the input signal or the inverted signal to controller 120 based on a control signal received by circuit 150.

In the shown example, circuit 150 includes an inverter 152 and a multiplexer 154. An input terminal of inverter 152 is coupled to input terminal 116-I on the command bus 116, and an output terminal of inverter 152 is coupled to output terminal 116-O on the command bus 116. Furthermore, the input terminal of inverter 152 is further coupled to a first input terminal of multiplexer 154, and the output terminal of inverter 152 is further coupled to a second input terminal of multiplexer 154.

In some implementations, inverter 152 can be configured to invert an input signal received on the command bus 116 to generate an inverted signal. In some implementations, multiplexer 154 can be configured to select, based on a control signal, one of two input signals including a first input signal that is received as the input signal of inverter 152 and a second input signal that is received as the inverted signal of inverter 152, and transmit the selected input signal to controller 120.

Controller 120 of IC chip 100 is configured to manage and coordinate operations of various components within in IC chip 100. Controller 120 serves as an interface between computation engines 130 and other circuits or components of IC chip 100. Controller 120 can be configured to receive an input signal from circuit 150, and transmit an output signal to circuit 140. In some implementations, controller 120 can be communicatively coupled to computation engines 130, and can obtain computation results from computation engines 130.

IC chip 100 further includes one or more computation engines 130. Each of the computation engines 130 includes hardware components configured to perform computations in parallel with computation engines 130 of other IC chips 100. In some implementations, the computations include cryptographic hash computations, and the computation engines 130 can be referred to as hash engines. Hash engines can perform cryptographic hash computations using hash function algorithms such as SHA-1, SHA-256, or MD5, etc. In some implementations, the computation engines 130 are configured to perform machine learning computations, such as matrix multiplication for training and/or inference, e.g., for a large language model (LLM) or a generative AI model.

An example of an operating process of IC chip 100 includes receiving an input signal by IC chip 100 at input terminal 116-I on the command bus 116. In some implementations, the input signal can be received from an upstream neighboring IC chip that is series-connected to IC chip 100. IC chip 100 performs an inverting operation on the input signal by using inverter 152 to generate an inverted signal, and transmits the inverted signal on the command bus 116. In some implementations, the inverted signal can be transmitted on the command bus 116 to a downstream neighboring IC chip that is series-connected to IC chip 100. IC chip 100 can further conditionally forward the input signal or the inverted signal to controller 120 based on an odd or even configuration of IC chip 100 in an ordered arrangement of multiple IC chips including the upstream neighboring IC chip, IC chip 100, and the downstream neighboring IC chip. In some examples, when IC chip 100 is an even chip on the command bus 116, circuit 150 can be instructed to forward the input signal to controller 120. When IC chip 100 is an odd chip on the command bus 116, circuit 150 can be instructed to forward the inverted signal to controller 120.

After receiving a signal from circuit 150, controller 120 can instruct the computation engines 130 to perform computations such as cryptographic hash computations or machine learning computations. Computation engines 130 can return a computation result to controller 120.

Another example operating process of IC chip 100 includes receiving an input signal by IC chip 100 at input terminal 118-I on the response bus 118. The input signal can be received from an upstream neighboring IC chip that is series-connected to IC chip 100. IC chip 100 can combine the input signal and a signal produced by controller 120 by using circuit 140 to generate a combined signal, and transmit the combined signal as an output signal on the response bus 118. IC chip 100 can combine the input signal and the signal produced by controller 120 based on an even or odd configuration of IC chip 100. When IC chip 100 is an even chip on the response bus 118, IC chip 100 can combine the input signal and the signal produced by controller 120 by using AND gate 144 to generate a combined signal, and invert the combined signal by using inverter 145 to generate an inverted signal as an output signal on the response bus 118. When IC chip 100 is an odd chip on the response bus 118, IC chip 100 can invert the input signal by using inverter 147 to generate an inverted signal, and combine the inverted signal and the signal produced by controller 120 by using AND gate 146 to generate a combined signal as an output signal on the response bus 118. The output signal of IC chip 100 on the response bus 118 can be transmitted to a downstream neighboring IC chip that is series-connected to IC chip 100.

The signal produced by controller 120 can be generated based on one or more computation results from computation engines 130. The signal produced by controller 120 can be an idle signal. The signal can encode the computation results.

FIG. 1 shows an example of IC chip 100 that is configured for series connections with other IC chips. However, IC chips 100 within the scope of this disclosure are not limited thereto. For example, IC chips 100 can be configured to have power and/or data connections in parallel with other IC chips 100. An example of such an IC chip is IC chip 200 of FIG. 2B of U.S. application Ser. No. 19/035,308, which is incorporated herein by reference. For example, to be configured for parallel connections, the IC chip 100 may not include (and/or may not use or operate) terminals 110-O, 112-O, 114-O, 116-O, and/or 118-I, and/or circuits 140 and/or 150; may receive commands from a controller (such as controller 204) at terminal 116-I; and/or may provide outputs to the controller at terminal 118-O. FIGS. 1A-1B of U.S. application Ser. No. 19/035,308 (which is incorporated by reference herein in its entirety for all purposes) illustrate parallel power and data connections for IC chips, and these connections can be applied to the IC chips 100 described herein. For example, the computing device 200 of FIG. 2 has a parallel configuration of IC chips 100.

Further examples of IC chips and their operating principles are described in U.S. application Ser. No. 18/217,185, which is incorporated by reference herein in its entirety for all purposes.

Figure 2:
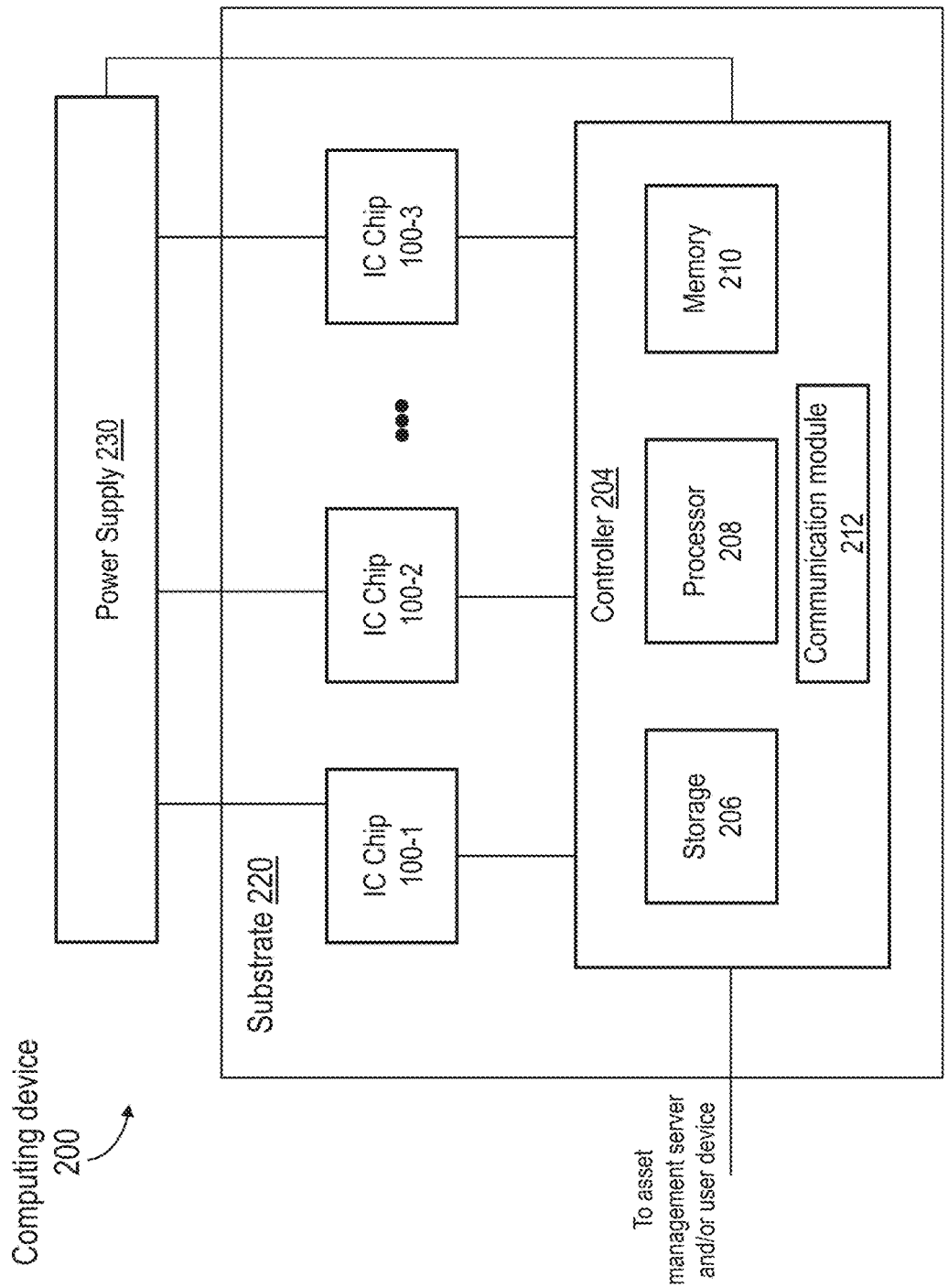
FIG. 2 is a diagram illustrating an example of a computing device including multiple IC chips.

FIG. 2 is a diagram illustrating an example of a computing device including multiple IC chips. As shown in FIG. 2, a computing device 200 can include multiple IC chips 100-1, 100-2, 100-3 configured to perform their computations in parallel to one another. The computing device 200 further includes a controller 204 and a power supply 230. The computing device 200 can be referred to as an "asset," e.g., a cryptomining asset or a machine learning computation asset.

In some implementations, the IC chips 100 are arranged on a common substrate 220. The substrate 220 can be, for example, a semiconductor substrate, a dielectric substrate, or a printed circuit board (PCB). The IC chips 100 can be mounted on a common surface of the substrate. For example, the IC chips 100 can be mounted on the substrate using a through-hole, surface-mount, or ball-grid array (BGA) mount that electrically couples the IC chips 100 to conductive (e.g., metal) interconnections on and/or in the substrate. The substrate can be substantially planar, and the multiple IC chips 100 can be mounted in a common manner on the substantially planar substrate, e.g., using a same mounting method on a same mounting surface of an integral portion of the substrate. In some implementations, as shown in FIG. 2, the controller 204 is on the substrate 220. In some implementations, the controller 204 can be at least partially on a different substrate or otherwise separate from the substrate 220.

The IC chips 100 can perform the computations and processing described with respect to FIG. 1 based on commands/instructions sent to the IC chips 100 by the controller 204. The IC chips 100 can perform a same type of computation in parallel to one another. For example, the IC chips 100 can use their respective computation engines 130 to, in parallel, execute a same hash function algorithm, execute a same matrix multiplication process for machine learning, and/or the like. In some implementations, the computations performed by the IC chips 100 are independent of one another. For example, in some implementations, each IC chip 100 can perform its computations based on control by the controller 204, without requiring, for the computations, data or inputs from other IC chips 100. However, joint or mutually-dependent computations are also within the scope of this disclosure.

The controller 204 can include one or more processors 208 (referred to hereafter as processor 208), a storage 206, a memory 210, and a communication module 212. The controller 204 can be similar to the computer system 2000 described with respect to FIG. 20. The processor 208 can execute instructions stored in the memory 210, and can use the communication module 212, to perform operations such as sending instructions, inputs, and the like to the IC chips 100; receiving outputs from the IC chips 100; sending control instructions to the power supply 230, e.g., to adjust power supplied to the IC chips 100; and/or to communicating with one or more external devices, such as the asset management server 310 and/or user device 350. For example, the controller 204 can receive output data from the IC chips 100, where the output data includes results of the parallel computations performed by the IC chips 100. The controller 204 can send the output data to the asset management server 310 and/or the user device 350.

In some implementations, the controller 204 receives event data from the asset management server 310 and/or the user device 350 to schedule power events for the computing device 200, as described in reference to FIGS. 4 to 13. The controller 204 can provide control signals to the IC chips 100 and/or the power supply 230 to execute the power events. For example, to switch from a normal mode to a standby mode, the controller 204 can cause the power supply 230 to stop providing power to one or more of the IC chips 100, and/or can cause controllers 120 of one or more IC chips 100 to terminate computation by computation engines 130. To switch from a standby mode to a normal mode, the controller 204 can cause the power supply 230 to resume providing power to one or more of the IC chips 100, and/or can cause controllers 120 of one or more IC chips 100 to resume computation by computation engines 130.

The power supply 230 can be a single power supply unit or can include two or more distinct power supply modules or devices, e.g., in separate enclosures and/or on separate circuit boards. In some implementations, the power supply 230 includes one or more circuit boards, for example, one or more circuit boards and associated other components (e.g., wiring, cooling unit(s), and/or the like) constituting a power supply unit (PSU). The power supply 230 can be connected to the IC chips 100 and/or the controller 204 by one or more conductive elements, such as power rails, wiring, conductive mounts/standoffs, cables, and/or the like. The power supply 230 can include one or more regulators, rectifiers (e.g., adjustable DC-DC regulators), and/or the like for generating voltages supplied to the IC chips 100 and/or the controller 204. The IC chips 100 and/or the controller 204 can operate based on the supplied voltages.

The IC chips 100, the controller 204, the power supply 230, and elements thereof can be connected together by suitable wires, traces, vias, cables, mounts, and/or the like.

In some implementations, the computing device 200 can be configured to operate in a first power mode or a second power mode. In some implementations, the first power mode can be referred to as a "normal" or "active" power mode. In some implementations, the second power mode can be referred to as a "standby," "sleep, or "off" power mode. In the first power mode, the IC chips 100 can receive instructions, perform their same type of computations in parallel (e.g., cryptographic computations), and output computation results to the controller 204. In the first power mode, computation engines 130 of the IC chips 100 can execute computations.

In the second power mode, the computations of the IC chips 100 can be terminated. For example, the computation engines 130 can stop execution. For example, cryptographic and/or machine learning computations by the IC chips 100 can be terminated. In some implementations, in the first power mode, the IC chips 100 receive power from the power supply 230. In some implementations, in the second power mode, the IC chips 100 are unpowered, e.g., do not receive power from the power supply 230.

In some implementations, to switch from the first power mode to the second power mode, the controller 204 can send commands to controllers 120 of the IC chips 100 to cause the IC chips 100 to terminate computation. Responsive to the commands, the controllers 120 can cause the computation engines 130 to terminate computation. In some implementations, to switch from the second power mode to the first power mode, the controller 204 can send commands to controllers 120 of the IC chips 100 to cause the IC chips 100 to perform computation. The controllers 120 can cause the computation engines 130 to perform computation. In some implementations, to switch from the first power mode to the second power mode, the controller 204 can send a command to the power supply 230 to terminate provision of power to the IC chips 100. In some implementations, to switch from the second power mode to the first power mode, the controller 204 can send a command to the power supply 230 to provide power to the IC chips 100. Any suitable signal/command type and/or encoding can be used for providing these commands, instructions, and other control signals described herein.

In some implementations, in the second power mode, at least some operations of the controller 204 are enabled. For example, at least some operations of the communication module 212 may be enabled in the second power mode, such that the controller 204 can communicate with an asset management server and/or user device.

In some implementations, power mode can be switched on a per-IC chip 100 basis. For example, one or more of the IC chips 100 of the computing device 200 can be switched from the first power mode to the second power mode, while remaining IC chips 100 may not be switched. In some implementations, to selectively switch the power mode of the IC chips 100, the controller 204 can selectively send switch commands only to the IC chips 100 that are to be switched. In some implementations, to selectively switch the power mode of the IC chips 100, the controller 204 can send switch commands that indicate the IC chips 100 that are to be used switched. For example, the switch commands can include IC chip identifiers (e.g., serial numbers) and/or the like. When a controller 120 of an IC chip 100 receives the switch command, the controller 120 can check whether the IC chip 100 is indicated by the switch command. If so, the controller 120 can switch the power mode of the IC chip 100, e.g., by controlling the computation engines 130 of the IC chip 100 to terminate/start computation. As such, based on selective control, IC chips 100 can operate in multiple power modes (such as first/second power modes). References herein to computing devices 200 switching power modes should be understood to include cases of one or more IC chips 100 of the computing devices 200 switching power modes, except where noted otherwise or suggested otherwise by context.

Computation by the IC chips 100 may be associated with a large amount of power, such that power consumption is significantly decreased when switching from the first power mode to the second power mode.

Figure 3:
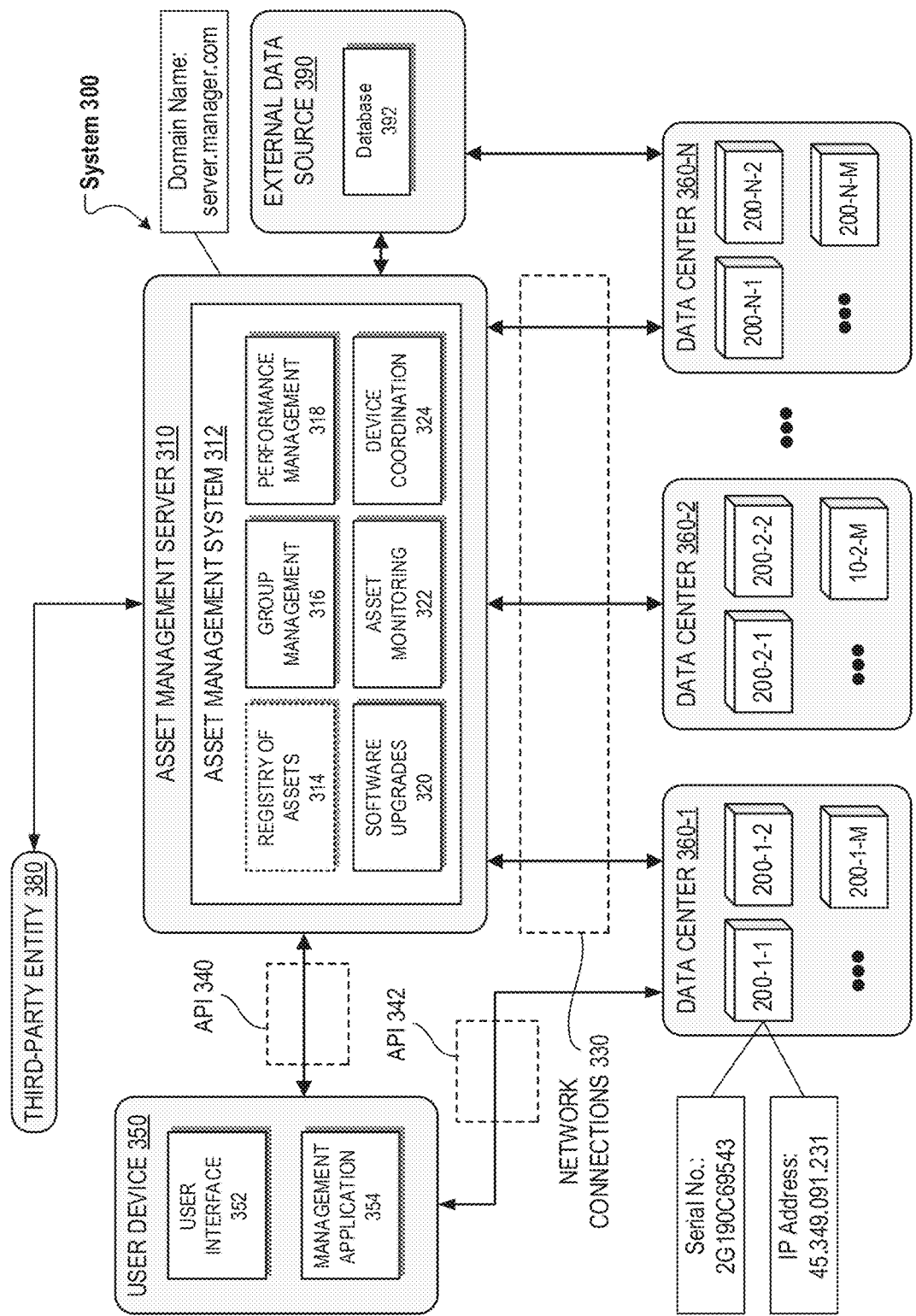
FIG. 3 is a diagram illustrating an example of a system including multiple computing devices and an asset management server.

FIG. 3 is a schematic diagram illustrating an example of a system (or computer network) 300 including an asset management server 310 and multiple computing devices 200.

The asset management server 310, sometimes referred to as a Fleet Management Console (FMC), can be a dedicated hardware device or data center located in a "central" location for centralized control of the computing devices 200. Alternatively, the server 310 can be a cloud server dispersed over one or more data centers in one or more locations. In the example of FIG. 3, computing devices 200 are housed in multiple data centers 360-1 through 360-N. A first collection of computing devices 200-1-1 through 200-1-M are housed in a first data center 360-1, a second collection of computing devices 200-2-1 through 200-2-M are housed in a second data center 360-2, and so on. In general, the system 300 can include any number of computing devices 200, e.g., one thousand, ten thousand, one hundred thousand, one million, or more computing devices 200, housed in any number of data centers 360, e.g., one, two, five, ten, fifty, one hundred, or more data centers 360. Each computing device 200 can include multiple IC chips 100 (e.g., tens, hundreds, or more), such that the asset management server 310 can be responsible for managing a large number of IC chips 100. The server 310 is configured to control each computing device 200 in the system 300 such that each computing device 200 performs computations as directed by server 310. Various ways server 310 can manage and control the computing devices 200 are described in the following.

The system 300 can be or include a wide area network (WAN) such that server 310 has a domain name (e.g., "server.manager.com") and each computing device 200 has a respective unique identifier (UID) in the form of a serial number (e.g., "2G190C69543"). Each computing device 200 also has a network (IP) address (e.g., "45.349.091.231") for communicating with the server 310 via network connections 430. For example, an administrator can assign the domain name to the server 310, and the server 310 can dynamically generate the network addresses of each computing device 200 when they are connected to the network of the system 300, e.g., using Dynamic Host Configuration Protocol (DHCP). Alternatively, a network provider can generate the network addresses of each computing device 200 when they are connected to the network of the system 300. Combinations of both the server 310 and the network provider generating network addresses for the computing devices 200 can also be implemented. For example, when the server 310 and one or more computing devices 200 are first installed, respective network addresses of the server 310 and one or more computing devices 200 can be assigned by the network provider. Thereafter, the server 310 can handle generation of the network addresses for new computing devices 200 that are connected to the server 310.

The network connections 330 can be securely established and configured for bidirectional transmission of network messages using an appropriate communication protocol, e.g., using WebSocket, HTTPS, or other protocols. The server 310 can communicate with user device(s) 350 and other devices or platforms (e.g., other servers) via a secure Application Programming Interface (API) 340. For example, a user can provide user inputs to a user interface 352 (e.g., a web or mobile application) on user device 350 (e.g., a mobile, tablet, laptop, personal computer, or other device) to control any computing devices 200 that the user owns. Examples of user interfaces associated with power events are illustrated in FIGS. 14 to 18.

Instead of, or in addition to, control by the server 310, in some implementations, user devices 350 can communicate with the computing devices 200 through a connection that bypasses the server 310. For example, user devices 350 can use an API 342 to communicate with the computing devices 200.

As shown in FIG. 3, an asset management system 312 is implemented on the server 310 as computer programs to perform the various functions of the server 310. In this example, the asset management system 312 includes: a registry of assets 314, a group management subsystem 316, a performance management subsystem 318, a software upgrade subsystem 320, an asset monitoring and reporting subsystem 322, and a device coordination subsystem 324.

Note that the registry and subsystems 314-324 are shown as individual components of asset management system 312 for ease of description and illustrative purposes only. Asset management system 312 can be configured to perform some or all of the functions of each subsystem 314-324.

Registry 314 includes the respective UID and network address of each computing device 200 connected to the server 310. Server 310 can use the registry 314 to maintain an ongoing record of all the computing devices 200 in the system 300, e.g., when and how long each computing device 200 has been active in the system 300, which computing devices 200 are available or unavailable, which computing devices 200 need maintenance or have gone out of service, etc.

Group management subsystem 316 allows the server 310 to perform multiple functions related to grouping of computing devices 200, including one or more of the following. Server 310 can automatically group multiple computing devices 200 automatically accordingly to one or more common features of the computing devices 200. For example, the server 310 can group multiple computing devices 200 into a group of computing devices according to a common geolocation of the computing devices 200, common hardware specifications among the computing devices 200, a common owner of the computing devices 200, etc. The server 310 may also receive user inputs through user interface 352 corresponding to a manual selection of multiple computing devices 200 that are to be grouped together into a group of computing devices. Server 310 can also control a group's visibility and accessibility to user devices 350. Server 310 can control the operation details of groups of computing devices, both at a high level (e.g., by targeting a total net hash rate of an entire group of computing devices performing a mining operation) and at a low level (e.g., by targeting a respective hash rate for each computing devices in the group).

Performance management subsystem 318 allows server 310 to perform functions relating to computing device 200 configuration, including one or more of the following. The server 310 can configure the energy tune of a computing device 200, e.g., automatically (or manually via user inputs through user interface 352) increasing or decreasing the power consumption of the computing device 200. The server 310 can configure power consumption constraints of a computing device 200, e.g., a bound between a maximum power consumption and/or a minimum power consumption for the computing device 200 to operate at. For example, the server 310 can specify power consumption constraints based on the hardware specification of a computing device 200, constraints of a service provider servicing the computing device 200, and/or constraints of the data center 360 that the computing device 200 may be housed in. The server 310 can ramp up and/or down one or multiple computing devices 200 under any critical conditions such as power surges. For example, the server 310 can receive periodic updates from a server provider managing power to and from a data center 360 and a grid. The server 310 can then ramp up and/or down a group of computing devices housed in the data center 360 to coordinate with expected (or unexpected) power interruptions. The server 310 can further perform pool configuring for one or more pools of computing devices, e.g., pooling network connections of computing devices using a pooling server and pushing a common set of pool configurations to a computing devices pool, e.g., for performing a certain mining operation.

Further, or instead, the performance management subsystem 318 can perform scheduling and control of power events for the computing devices 200. For example, the performance management system can receive requests from user devices 350 and/or third-party entities 380, generate and send event data, monitor external data such as price data (e.g., by accessing external data source 390), and/or perform other operations described as being performed by the asset management server 310 in reference to FIGS. 4 to 9 and 14 to 18.

Software upgrade subsystem 320 allows server 310 to perform functions relating to computing device 200 software upgrading and network configuring, including one or more of the following. Server 310 can transmit hash rate settings (e.g., target hash rates to an individual computing device 200, all computing devices 200, or selected groups of computing devices 200. The hash rate settings can include target hash rates that maximize a rate of return (e.g., expected USD per second) for the individual computing device 200, all computing devices 200, or the selected groups of computing devices 200 that are performing a cryptocurrency mining operation for a cryptocurrency. For example, the server 310 can retrieve an energy rate (e.g., measured in USD per kilowatt-hour) from a service provider servicing a particular data center 360. The server 310 can also retrieve parameters of the cryptocurrency from a market of the cryptocurrency, such as a current price, difficulty, and block subsidy of the cryptocurrency. The server 310 can then determine the hash rate settings from the energy rate and cryptocurrency parameters, e.g., using an optimization technique, which optimizes the rate of return. Server 310 can send software and/or firmware upgrades to an individual computing device 200, all computing devices 200, or selected groups of computing devices 200, e.g., to fix bugs and improve features of custom software and/or the operating system running on the computing device(s) 200. Further, server 310 can transmit network configurations (e.g., using DHCP) for the network connections 330, e.g., Web-Socket or HTTPS parameter configurations, to an individual computing device 200, all computing devices 200, or selected groups of computing devices 200.

Asset monitoring and reporting subsystem 322 allows server 310 to perform functions relating to health status monitoring of any and all computing devices 200, including one or more of the following. Server 310 can track health status information of each computing device 200 while the computing device 200 is in operation, such as contemporaneous, or near-contemporaneous health status tracking. For example, the health status information can include a temperature of the computing device 200, a memory usage of the computing device 200, cache hit metrics of the computing device 200, or any other performance or health metrics of the computing device 200 while it is in operation. Server 310 can also record any alerts signaling faults and/or failures of each computing device 200 while the computing device 200 is performing a mining operation. For example, server 310 can record static or dynamic faults corresponding to incorrect bit values when the computing device 200 is performing the mining operation. Server 310 can then generate standard formatted reports (e.g., PDF, CSV, or other formats) that includes the health status information of a computing device 200 (or multiple computing devices 200) over a specific timeframe. Server 310 can forward the reports to a user (e.g., an owner of the computing device(s) 200) and/or an administer of the server 310 for analysis and/or investigation.

Device coordination subsystem 324 allows server 310 to perform functions relating to coordination of user devices 350. For example, the server 310 can share the asset management information (e.g., health status information of a user's computing devices 200) generated and/or recorded by the server 310 with the user devices 350 via the API 340.

The user device 350 can implement one or more software to access the asset management server 310 and/or the computing devices 200 using API 340 and/or 342. For example, a management application 354 installed on the user device 350 can receive user inputs through the user interface 352 and perform suitable corresponding operations. As another example, the user device 350 can access a webpage that presents the user interface 352. The management application 354 can generate and send requests for power events (e.g., as described with respect to FIGS. 4 to 9), generate and send event data (e.g., as described with respect to FIGS. 10 to 13), send designations for third-party entities 380, and/or perform other operations described herein as being performed by the user device 350.

Figure 4:
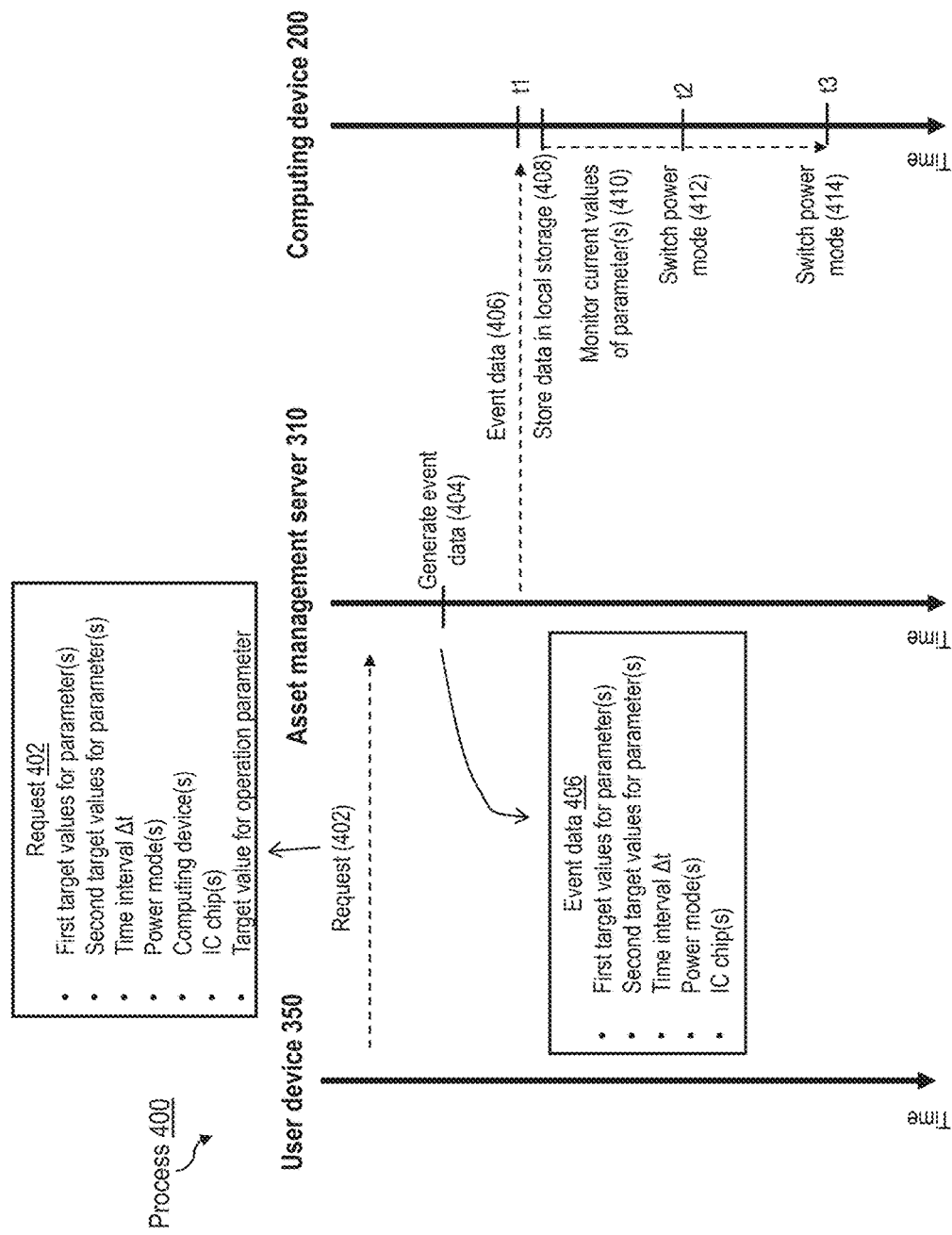
FIG. 4 is a diagram illustrating an example of a process for a power event.

FIG. 4 illustrates an example of a power control process 400 for a power event, according to some implementations of the present disclosure. The process 400 can be performed, for example, jointly by the user device 350, asset management server 310, and computing device 200.

As shown in FIG. 4, the user device 350 can send, to the asset management server 310, a request 402 to schedule a power event for at least one computing device 200. For example, the request 402 can be input using the user interface 352 and provided to the server 310 using API 340. The request 402 can include, indicate, or provide any of the types of data described herein as being included in event data 406 (discussed below), such as first/second target value(s) for parameters such as energy price and/or time (e.g., t2, t3, strike price, and/or the like), condition(s) associated with the target value(s), one or more power modes to be switched to, a time interval Δt, indicators of specific computing device(s) 200 and/or IC chip(s) 100 that are to perform power mode switching, a target value for an operation parameter based on which the specific computing device(s) 200 and/or IC chip(s) 100 are to be determined, and/or other data described herein as being used for event data generation.

In some implementations, the request 402 provides identifiers of the at least one computing device 200 for which the power event is to be scheduled. For example, the request can include serial numbers and/or IP addresses to identify the at least one computing device 200. The asset management server 310 can use the identifiers to target the at least one computing device 200 for transmission of the event data 406.

As an example of request transmission using API 340, the user device 350 can use any suitable program/application to access an API URL, or a cloud API endpoint, exposed to user devices. A request 402 provided through the API can include content in JSON format or another suitable format; an email (e.g., "customermail@domain.com"); and an API key. A body of the request 402 can, for example, be: {"config_type": "EventRequest", "config": {"ISO": "NONE", "EventType": "Curtail", "StartTime": [t2], "End-Time": [t3], "ChangePower: 0.002}}.

In response to the request, the asset management server 310 generates event data 406 (404). The event data 406 includes, indicates, and/or provides first target values for one or more parameters based on which the at least one computing device 200 will switch from a first power mode to a second power mode. For example, the first target values can include a time (e.g., t2 and/or t6) at which the power mode is to be switched (e.g., as described with respect to FIGS. 5 to 9). Instead, or additionally, the first target values can include a price condition based on which the power mode is to be switched (e.g., as described with respect to FIGS. 7 to 9).

In some implementations, the event data 406 provides second target values for one or more parameters based on which the at least one computing device 200 will switch from the second power mode back to the first power mode. For example, the second target values can include a time (e.g., t3) at which the power mode is to be switched back to the first power mode (e.g., as described with respect to FIGS. 5 to 9).

Figure 6:
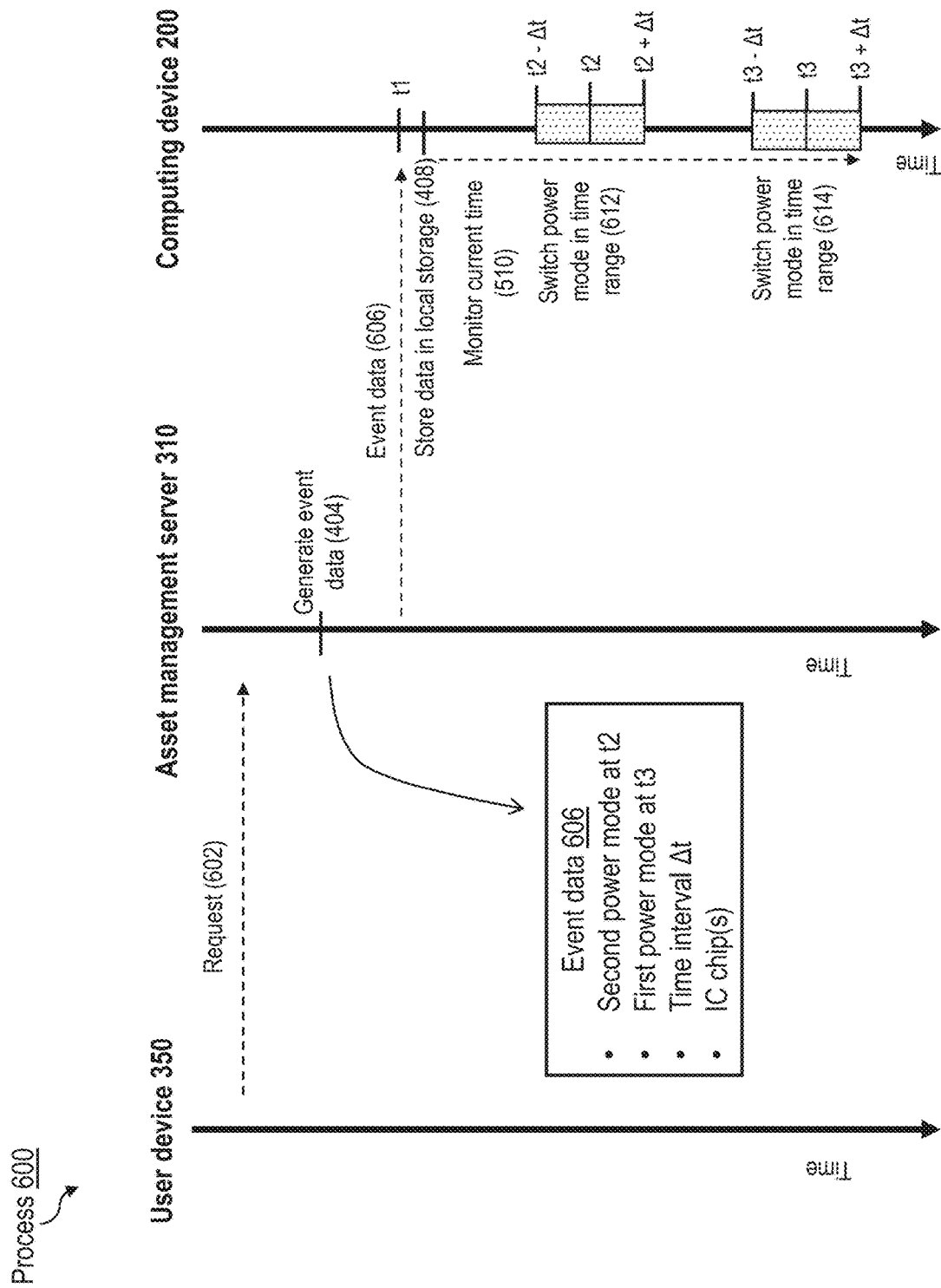
FIG. 6 is a diagram illustrating an example of a process including time intervals for a power mode switch.
Figure 19:
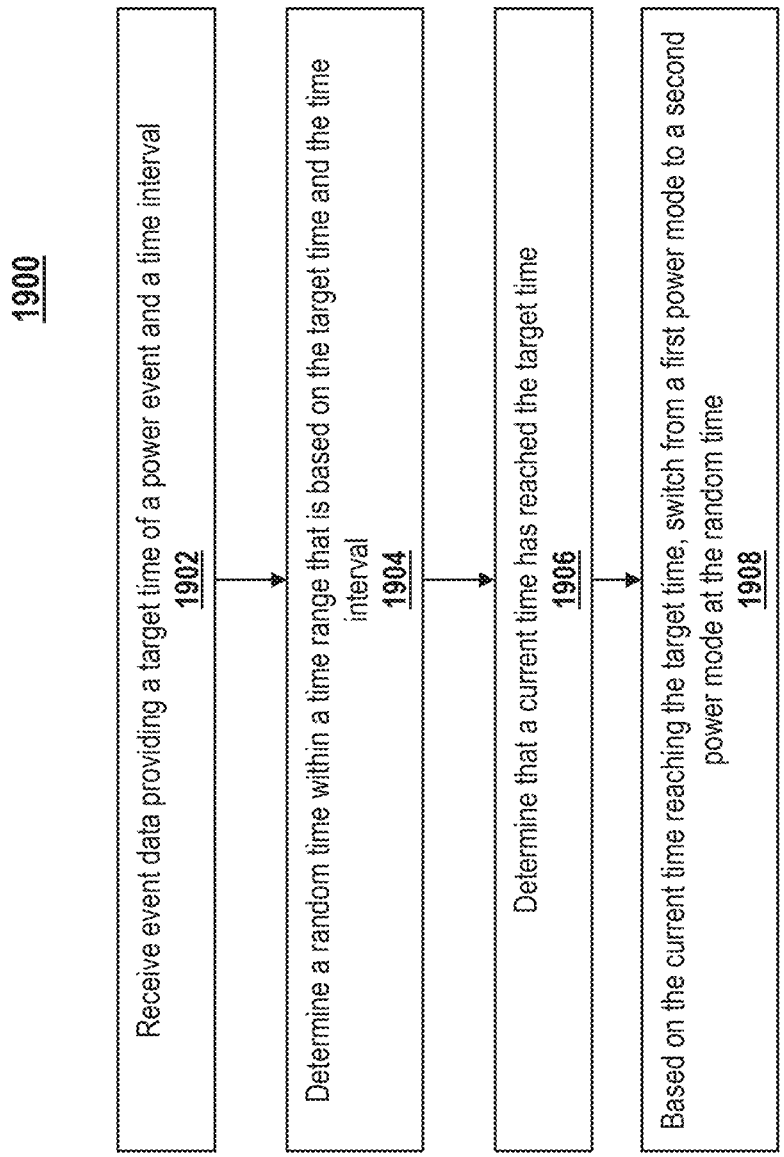
FIG. 19 is a diagram illustrating an example of a process for a power event.

In some implementations, the event data 406 provides a time interval Δt over which execution of the power event is to be distributed (e.g., as described with respect to FIGS. 6 and 19).

In some implementations, the event data 406 provides type(s) of power modes to/from which the computing device 200 will switch in the power event. For example, the event data 406 can provide an indication that the computing device 200 should switch to the second power mode based on the first target values being reached, and should switch to the first power mode based on the second target values being reached.

In some implementations, the event data 406 provides indicators of one or more IC chips whose power mode is to be switched, e.g., in cases in which fewer than all of the IC chips 100 of the computing device 200 are to be switched. For example, the event data 406 can provide identifiers (e.g., serial numbers) of one or more of the IC chips 100, and/or can provide characteristics of IC chips 100 based on which the IC chips 100 are to be switched. For example, the event data 406 can indicate that IC chips having a certain model type, a certain error status (e.g., no error), satisfying a lifetime condition (e.g., having performed computations for more/less than a threshold duration of time), satisfying an efficiency condition (e.g., providing a Joules per terahash (J/TH) more/less than a threshold value), and/or the like, are to have their power mode switched in the power event.

The asset management server 310 sends the generated event data 406 to the at least one computing device 200, represented in FIG. 4 as a computing device 200. For example, the asset management server 310 can send the event data 406 through the network connections 330, such that the at least one computing device 200 indicated in the request 402 from the user device 350 receives the event data 406. The event data 406 is sent and/or received at a first time t1. It will be understood that the time of transmission and the time of reception may not be exactly identical, e.g., based on network latency, finite speed of data transmission, and/or the like. However, in some implementations, transmission and reception occur substantially at the same first time t1.

In some implementations, the computing device 200 stores the event data 406, or the data indicated/provided by the event data 406, in a storage and/or memory of the computing device 200 (408). For example, a controller 204 of the computing device 200 can store the data in storage 206 and/or in memory 210, which can be together referred to as "local storage." As such, subsequent operations of the computing device 200 based on the event data 406 can be performed independent of control by the asset management server 310, based on the locally-stored data. For example, even in the case of a network interruption that prevents control of the computing device 200 by the server 310, the computing device 200 can execute power events based on the locally-stored data. The stored data can include any or all of the event data 406.

The computing device 200 monitors current values of the one or more parameters of the event data 406 (410). For example, the computing device 200 can monitor a current time and/or a current price, as described with respect to FIGS. 5 to 9). During monitoring (410), the computing device 200 can periodically check whether the first target values have been reached. For example, the computing device 200 can check every ten seconds or at another rate.

Based on the monitored current values reaching the one or more first target values, the computing device 200 switches one or more of its IC chips 100 from a first power mode to a second power mode (412). For example, the computing device 200 can switch the one or more IC chips from a normal mode to a standby mode, or from the standby mode to the normal mode. The switch from the first power mode to the second power mode can occur at a start time t2. In some implementations, t2 is after t1, e.g., as in the case of a pre-scheduled power event. In some implementations, t2 is at substantially the same time as t1, e.g., as in some implementations of conditional power events triggered by the asset management server 310. To switch from the first power mode to the second power mode, the controller 204 of the computing device 200 can send suitable corresponding commands to the one or more IC chips 100 and/or power supply 230, as described with respect to FIG. 2.

In some implementations, at an end time t3 after the time t2 at which the one or more IC chips 100 of the computing device 200 are switched from the first power mode to the second power mode, the one or more IC chips 100 are switched from the second power mode to the first power mode (414). For example, the one or more IC chips 100 can be switched from standby mode to normal mode. For example, operation 414 can be performed based on the monitored current value reaching the second target values, e.g., in response to a predetermined time elapsing or in response to a price condition being satisfied.

In some implementations, for any of the processes described with respect to FIGS. 4 to 13, the server 310 or user device 350 (e.g., whichever generates and sends event data) can optionally perform operations to determine, from among multiple computing devices 200, which one or more computing devices 200, and/or which one or more IC chips 100 of the computing devices 200, should have their power mode switched. For example, as shown in FIG. 4, the request 402 can provide a target value for an operation parameter, such as a target change in power consumption, a target change in computation rate (e.g., hash rate or mining rate), a target aggregate (total) power consumption, or an aggregate (total) computation rate. The server 310 or user device 350 can determine which computing device(s) 200 and/or IC chip(s) 100 should have their power mode switched in order to achieve the target value of the operation parameter. For example, the server 310 or user device 350 can solve a constrained optimization problem where a constraint includes the target value of the operation parameter. For example, the server 310 or user device 350 can determine which computing device(s) 200 and/or IC chip(s) 100 should have their power mode switched in order to achieve the target value of the operation parameter, while optimizing one or more other parameters such as computation rate, power consumption, an IC chip health indicator, and/or the like. The asset management server 310 or user device 350 can then send suitable event data 406 to the determined computing devices 200. This process can be performed as described in U.S. application Ser. No. 18/680,247, incorporated by reference herein in its entirety.

Although not disclosed separately below, it will be understood that, for any of the processes of FIGS. 4 to 13, the server 310 or user device 350 can determine which computing device(s) 200 and/or IC chip(s) 100 are to undergo a power switch based on a target value for an operation parameter as provided in a request from a user device 350 or as input to the user device 350, e.g., instead of or in addition to the request itself indicating the computing device(s) 200 and/or IC chip(s) 100.

Figure 5:
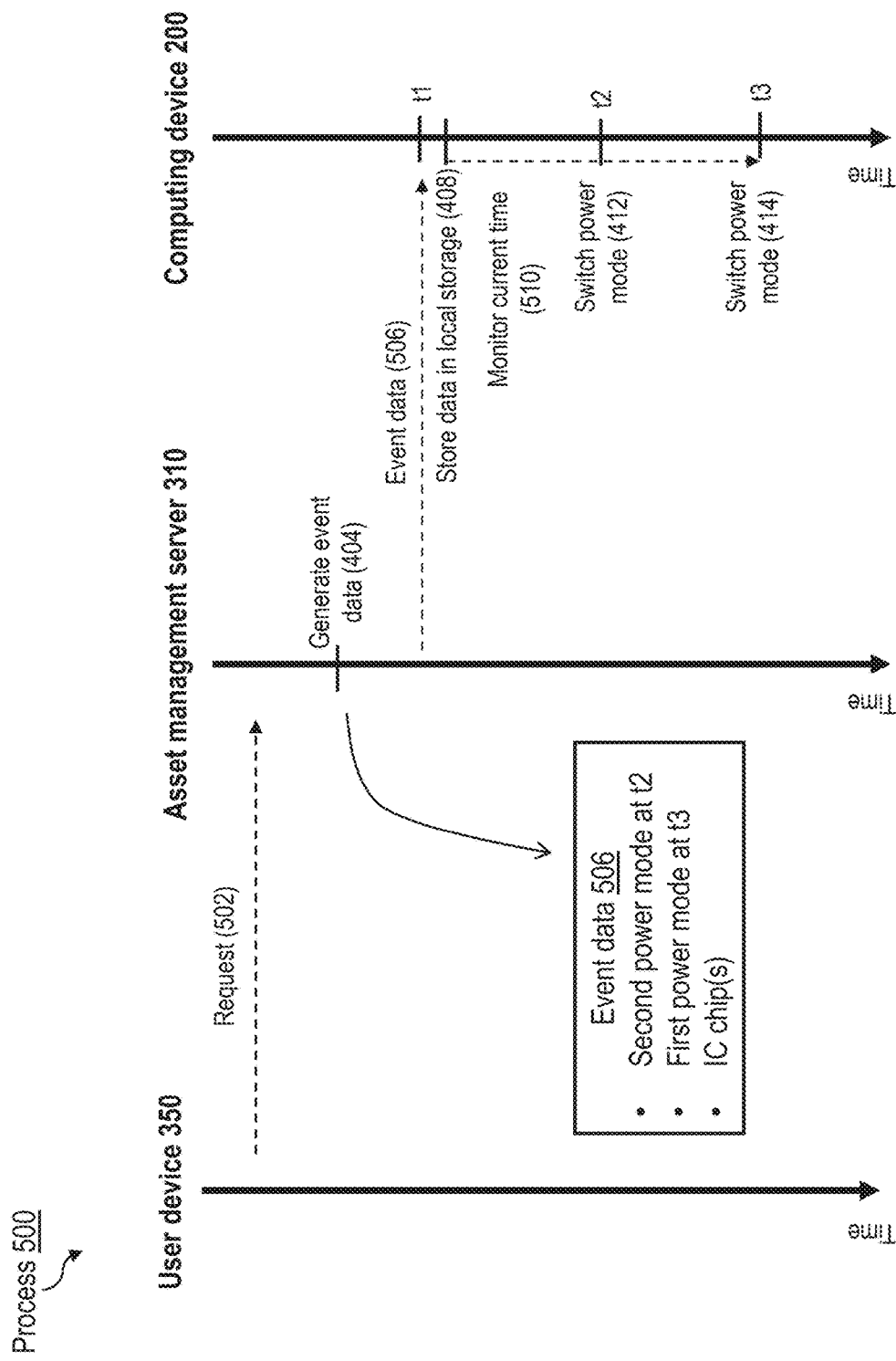
FIG. 5 is a diagram illustrating an example of a process including monitoring a current time for a power event.

FIG. 5 illustrates a process 500 for a power event, the process 500 including monitoring a current time. The process 500 is an example variation of the process 400. Process 500 corresponds to pre-scheduling of a power event for a future time. Operations and data of the process 500 can have the characteristics described for corresponding operations and data of the process 400, except where indicated otherwise.

In the process 500, the user device 350 sends a request 502 to schedule the power event to the asset management server 310. The request 502 can provide the data described above for request 402 and below for event data 506.

The asset management server 310 generates the event data 506 based on the request 502 (404). The event data 506 can provide instructions to switch from the first power mode to the second power mode at time t2, and (optionally) to switch from the second power mode to the first power mode at time t3. For example, the event data 506 can provide both t2 and t3 explicitly, and/or can provide t2 and a duration $t_{mode2}$ for which the computing device 200 is to remain in the second power mode, where $t3=t2+t_{mode2}$. It will be understood that the inclusion of t3, in all of the processes described herein, is not required, and that in some implementations the computing device 200 can remain in the second power mode indefinitely absent instructions otherwise.

The server 310 sends the event data 506 to the computing device 200, which receives the event data 506 and stores the event data 506 in a local storage (408). The event data can be received at time t1.

The computing device 200 monitors a current time (510), e.g., using a local clock, timer, and/or the like of the computing device 200. The computing device 200 can periodically check whether the current time has reached the time t2 indicated by the event data 506. For example, the computing device 200 can periodically compare the current time to t2 and check whether the current time matches or is later than t2, either of which corresponds to the current time reaching t2. The time t2 can be later than the time t1, e.g., minutes, hours, days, weeks, or more later.

Based on determining that the current time has reached t2, the computing device 200 switches one or more of its IC chips 100 from the first power mode to the second power mode (412), as described with respect to FIG. 4.

In some implementations, after time t2, the computing device 200 continues monitoring the current time (510), and, based on the current time reaching time t3 (which is after t2), the computing device switches the power mode of the one or more IC chips 100 back to the first power mode (414).

Some approaches to management of computing devices like computing devices 200 (e.g., computing devices that include multiple IC chips 100 that perform a same type of computation in parallel) rely on real-time, remote control. For example, to put such a computing device in standby mode, a remote server may transmit a standby command to the computing device, which switches to the standby mode in response to receiving the command. However, this arrangement may rely on real-time user inputs, providing a worse experience for end-users. Further, this arrangement may rely on an active network connection between the remote server and the computing device, and, in scenarios in which that network connection fails, it may not be possible to trigger a desired power event.

Some implementations according to the present disclosure, such as the process 500, provide improved control of computing devices by facilitating pre-scheduling of power events. For example, a user can interact with a calendar interface to configure power events for a future time (e.g., to provide request 402/502). Event data corresponding to the power event can be transmitted to a computing device ahead of time, and, when the future time is reached, the computing device can automatically execute the power event by switching the power mode of one or more of its IC chips. As such, users can schedule power events well in advance, can schedule recurring power events, and the like. In some implementations, the event data can have the form of calendar event data, permitting events to be scheduled, viewed, and modified in a calendar interface to improve user experience.

This mode of control may, for example, facilitate power control that conforms to power curtailment agreements and the like. An entity controlling computing devices may have agreements with an electricity provider that require the entity to restrict power usage at certain times, and failure to meet agreed-upon curtailed power levels may result in penalties. Based on the scheduling described herein, entities can be assured of curtailing their computing at these times using pre-scheduled power events.

Further, because data of the power event can be locally stored by the computing device, the computing device can execute the power event even in the absence of active control by, or even an active network connection with, the server at the time of the power event.

In some implementations, power events are phased-in over the course of a time interval $\Delta t$. For example, a power event to be applied to multiple computing devices can be executed by each of the computing devices at a different (e.g., randomly-generated) time. Based on this configuration, power surge events that might otherwise occur if all of the computing devices switched power mode at the same time may be avoided or mitigated. Power surges may occur, for example, when multiple computing devices switch from normal mode to standby mode at the same time (corresponding to a sudden decrease in power consumption) or when multiple computing devices switch from standby mode to normal mode at the same time (corresponding to a sudden increase in power consumption). These power surges may have harmful impacts on power grids, may be prohibited by relevant regulations and/or contracts, and/or may be associated with payment of high fees, e.g., to utilities. Time-distributed execution of power events, as described in reference to FIGS. 6 and 19, can eliminate or mitigate power surges and provide more gradual ramping up/down of power consumption.

FIG. 6 is a diagram illustrating an example of a process that incorporates time intervals for a power mode switch. Referring to FIG. 6, a process 600 provides phased execution of power events. Process 600 is an example variation of the process 400. Operations and data of the process 600 can have characteristics as described for corresponding operations and data of processes 400 and/or 500, except where noted otherwise or suggested otherwise by context.

The process 600 is similar to the process of FIG. 5, except that the request 602 and event data 606 further provide a time interval $\Delta t$ over which power mode switches are to be performed. In some implementations, $\Delta t$ is in a range from 30 seconds to 900 seconds, a range that has been found to provide adequate time distribution of power events and also to provide sufficiently rapid power mode switching in the context of the systems described herein.

The computing device 200 receives and stores the event data 608 and monitors the current time as described with respect to FIG. 5. Based on monitoring the current time, the computing device 200 switches one or more IC chips 100 from the first power mode to the second power mode within a time range that is based on the time interval $\Delta t$, e.g., within the time interval $\Delta t$ of time t2 (612). The computing device can switch the power mode based on the current reaching time t2, e.g., based on the current time matching t2 or based on the current time coming within $\Delta t$ of t2.

For example, in some implementations, the computing device 200 performs the power mode switch in a time range [t2−$\Delta t$, t2], e.g., at t2 or before t2 by at most $\Delta t$. This configuration can be referred to as "preceding phased execution." In some implementations, the computing device 200 performs the power mode switch in a time range [t2, t2+$\Delta t$], e.g., at t2 or after t2 by at most $\Delta t$. This configuration can be referred to as "subsequent phased execution."

In some implementations, the computing device 200 switches the power mode at a random time in the time range, e.g., at a random time in the time range [t2−$\Delta t$, t2] or [t2, t2+$\Delta t$]. For example, at a time between time t1 and time t2−$\Delta t$ or between time t1 and time t2, the computing device 200 can generate a random number. The random number can determine when in the time range the power mode is to be switched.

For example, the computing device can generate a random number in a range from 0 to 1 and can execute the power event at a time, in the time range, that is proportional to the generated random number. A generated 0 corresponds to performing the power mode switch at time t2−$\Delta t$ in the case of preceding phase execution, or at time t2 in the case of subsequent phased execution. A generated 1 corresponds to performing the power mode switch at time t2 in the case of preceding phase execution, or at time t2+$\Delta t$ in the case of subsequent phased execution. A generated 0.5 corresponds to performing the power mode switch at time t2−$\Delta t$/2 in the case of preceding phase execution, or at time t2+$\Delta t$/2 in the case of subsequent phased execution. It will be understood that this is merely an example, and that many other suitable randomization schemes for determining a random time in the time range are within the scope of this disclosure.

Randomizing the time of power event execution for each computing device 200, of multiple computing devices 200 executing the power event, has the effect of effectively distributing the power event over the time interval, because the computing devices 200 are expected to execute the power event at different random times. As a result, power surges can be mitigated or reduced, because the computing devices 200 (or IC chips 100 thereof) will be placed in normal or standby mode at different times, as opposed to all at the same time. Further, because, in some implementations, determination of the random time is performed by the computing device 200, coordination between computing devices 200, and/or centralized scheduling of random times for multiple computing devices 200, may not be necessary, simplifying the power event process. For example, independent randomization by each computing device 200 can have the effect of time-distributing execution of the power event, even without a coordinating mechanism.

Other methods for determining a time, in the time range, at which to switch the power mode (612) are also within the scope of this disclosure. For example, in some implementations, the server 310 determines a random time at which each computing device 200 is to switch its power mode (612), and event data 606 can provide the determined random time. In some implementations, the server 310 uses a non-random method for determining a time at which each computing device 200 is to switch its power mode (612). For example, the server 310 can space the times of power mode switches out evenly across the time range determined by Δt, and can provide the times in the event data 606 provided to each computing device 200.

Preceding phased execution and subsequent phased execution can offer respective advantages in various different contexts. Subsequent phased execution may be beneficial when unchanged computing device operation until a determined time-point is desirable. For example, if a user pays for control of/use of a group of computing devices 200 for a 24-hour period from a first midnight to a second midnight, it may be desirable for the computing devices 200 not to enter standby mode before the second midnight. Using subsequent phased execution for a switch from normal mode to standby mode, with t2 equal to the second midnight, ensures that all computing devices 200 in the group will remain in normal mode (e.g., actively performing computations, such as mining) until midnight. Preceding phased execution may be beneficial when requirements specify that the power event should be fully executed before a target time. For example, if an agreement is made with a power provider that no significant power draw by a group of computing devices 200 will occur after 1 PM, then preceding phased execution, for a switch from normal mode to standby mode, can be used with t2 equal to 1 PM, such that all computing devices 200 are assured of being in standby mode by no later than 1 PM. As such, the operations of FIG. 6 provide efficient spreading-out of power events in a manner compatible with real-world constraints and technical challenges.

In some implementations, the request 602 and/or event data 606 provide an indication of which type of phased execution the computing device 200 should use.

In some implementations, when another power event is scheduled at time t3 (e.g., a switch back from the second power mode to the first power mode), the second power event can optionally also be performed over a time range (614), using the same processes as described for operation 612.

Figure 7:
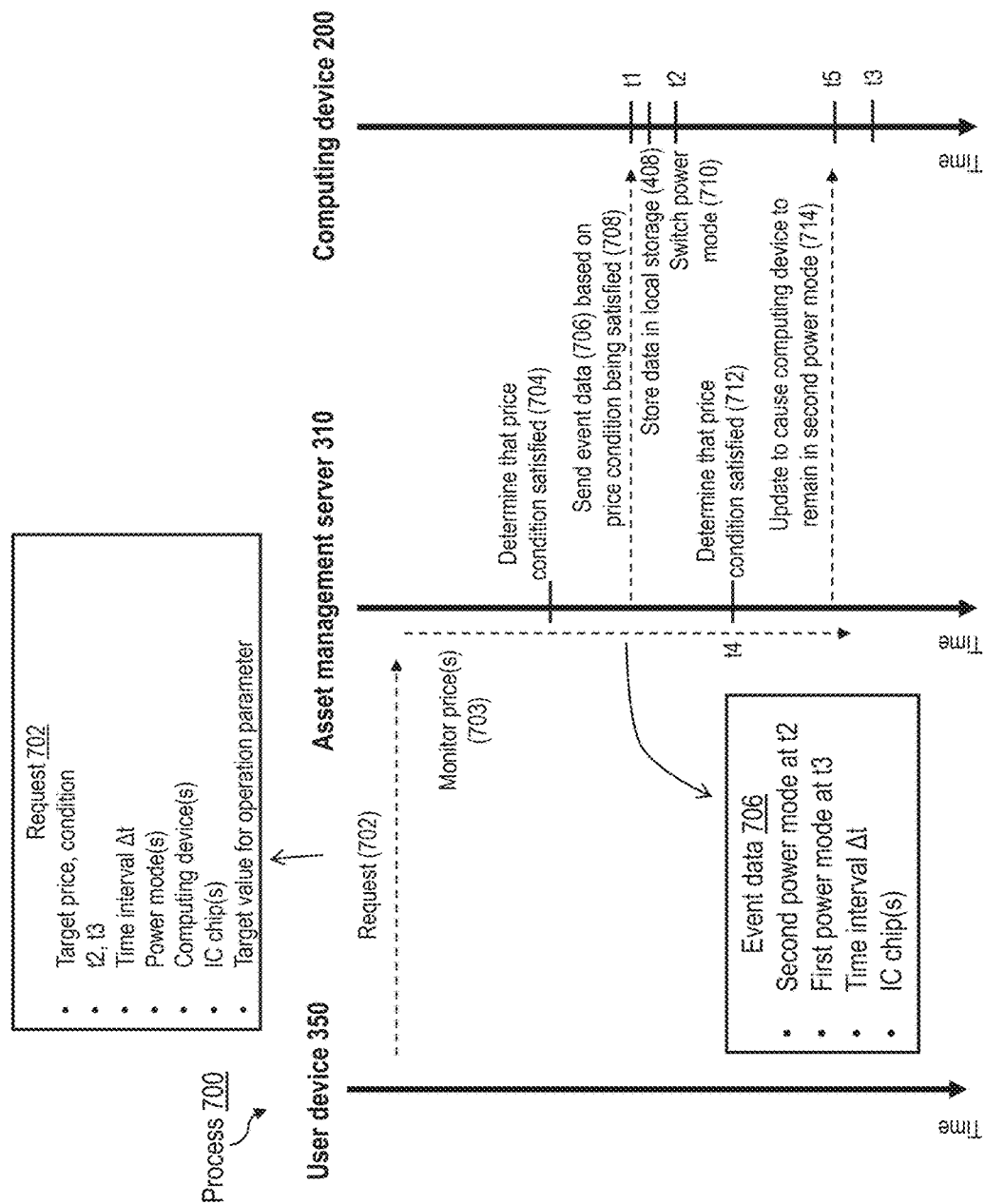
FIG. 7 is a diagram illustrating an example of a process of executing power events based on monitoring price.

In some implementations, instead of, or in addition to, power events being pre-scheduled to occur based on a future time, power events can be scheduled to occur based on a price condition being satisfied. FIG. 7 illustrates an example of a process 700 of executing power events based on monitoring price, e.g., in which price-based power events are executed based on monitoring by the server 310. The process 700 is an example of the process 400, and operations and data of the process 700 can have characteristics as described for corresponding operations and data of processes 400, 500, and/or 600, except where noted otherwise or suggested otherwise by context.

As shown in FIG. 7, in the process 700, a request 702 is sent from the user device 350 to the asset management server 310. The request 702 can provide one or more target prices based on which a power event is to be performed. The target prices can include, for example, an energy price (e.g., $/MWh), an asset price (e.g., a price of a cryptocurrency that the computing device 200 is configured to mine), and/or the like. The request 702 can provide a condition corresponding to the target price. The request 702 can further include other information noted above for request 402.

The request 702 is received by the asset management server 310, and the server 310 monitors one or more prices corresponding to the one or more target prices (703). For example, when the target prices include an energy price, the server 310 can monitor the spot price of electricity provided to the computing device 200. When the target prices include an asset price, the server 310 can monitor the spot price of the asset. For example, as shown in FIG. 3, the server 310 can access a database 392 of an external data source 390, such as a market data provider, an energy exchange, and/or the like, to retrieve the monitored price(s). The monitored price(s) can be monitored substantially in real-time to obtain real-time price(s).

Based on the monitoring, the server 310 can determine that a condition corresponding to the one or more target prices is satisfied (704). For example, the condition can include that at least one of the target prices is above a threshold value. For example, the condition can include that an energy price is above a target price. In some implementations, the condition is a joint condition based on multiple prices.

Based on the price condition being satisfied, the server 310 sends event data 706 to the computing device 200 (708). For example, based on the price condition being satisfied, the server 310 can generate and send the event data 706. The event data 706 can include data as described for event data 406, 506, and/or 706.

The event data 706 can be sent to the computing device 200 and received at the computing device 200 substantially at a time t1. In some implementations, the time t2, provided by the event data 706, at which the computing device 200 is configured to switch to a second power mode, substantially matches t1. For example, the server 310 can generate and send the event data 706 with t2 equal to a current time, such that, when the computing device 200 receives the event data 706, a current time matches or is later than t2. As such, upon receiving the event data 706, the computing device 200 can substantially immediately determine that the current time has reached t2 and, based on the determination, switch one or more of its IC chips 100 to the second power mode (710). The computing device 200 can determine that the current time has reached t2 based on monitoring the current time (510), not separately shown in FIG. 7.

In some implementations, t2 is a future time, and the computing device 200 can monitor the current time until the current time reaches t2, at which point the computing device 200 can switch power mode (710). For example, t2 can be provided in the request 702 or can be a predetermined time after the price condition is satisfied. As such, in some implementations, process 700 corresponds to a process 500 or 600 in which transmission of the event data 506 or 606 is based on a price condition being satisfied.

In some implementations, the event data 706, which is transmitted based on a price condition, can have a same data format as event data 506 or 606, which corresponds to a pre-scheduled future power event. For example, the event data 706 and the event data 506 or 606 can have a same configuration of data fields, data types, and/or the like. In the above manner, the system 300 can have a unified approach for controlling power events, whether the power events are based on timing, price conditions, or another condition.

Although not illustrated in FIG. 7, the switch to the second power mode (710) can be performed in a time range (e.g., randomly in the time range), as described in reference to FIG. 6.

In some implementations, the computing device 200 can locally store the event data 706 or data thereof (408). In some implementations, local storage is not performed, e.g., in some cases in which the computing device 200 substantially immediately switches to the second power mode (710) after receiving the event data 706.

In some implementations, the event data 706 provides a time t3, after t2, at which the computing device 200 is to switch from the second power mode to the first power mode. At time t3, the computing device 200 can switch the one or more IC chips 100 to the first power mode. In some implementations, if the price condition is still satisfied, it may be desirable for the computing device 200 not to switch back to the first power mode at time t3. Accordingly, in some implementations, the server 310 continues monitoring (703) the one or more prices, e.g., after sending the event data 706. The server 310 can determine that the price condition is still satisfied at a time t4 that is between t2 and t3 (712). At a time t5 before t3, based on determining that the price condition is still satisfied, the server 310 can send an update to the computing device 200 to cause the computing device 200 to remain in the second power mode at and after t3 (714). The update can include any suitable instruction or command. In some implementations, the update causes a t3 value, stored locally at the computing device 200, to be updated to a later time. In some implementations, based on determining that the price condition is not satisfied, the server 310 can determine not to send the update, and the computing device 200 can switch power mode at t3 as scheduled.

In some implementations, there may be multiple price conditions, and a power mode can switch multiple times based on the price conditions. For example, in process 800, illustrated in FIG. 8, two power events are executed based on two price conditions. Operations and data of the process 800 can be similar to corresponding operations and data of the process 700, except where noted otherwise or suggested otherwise by context.

Figure 8:
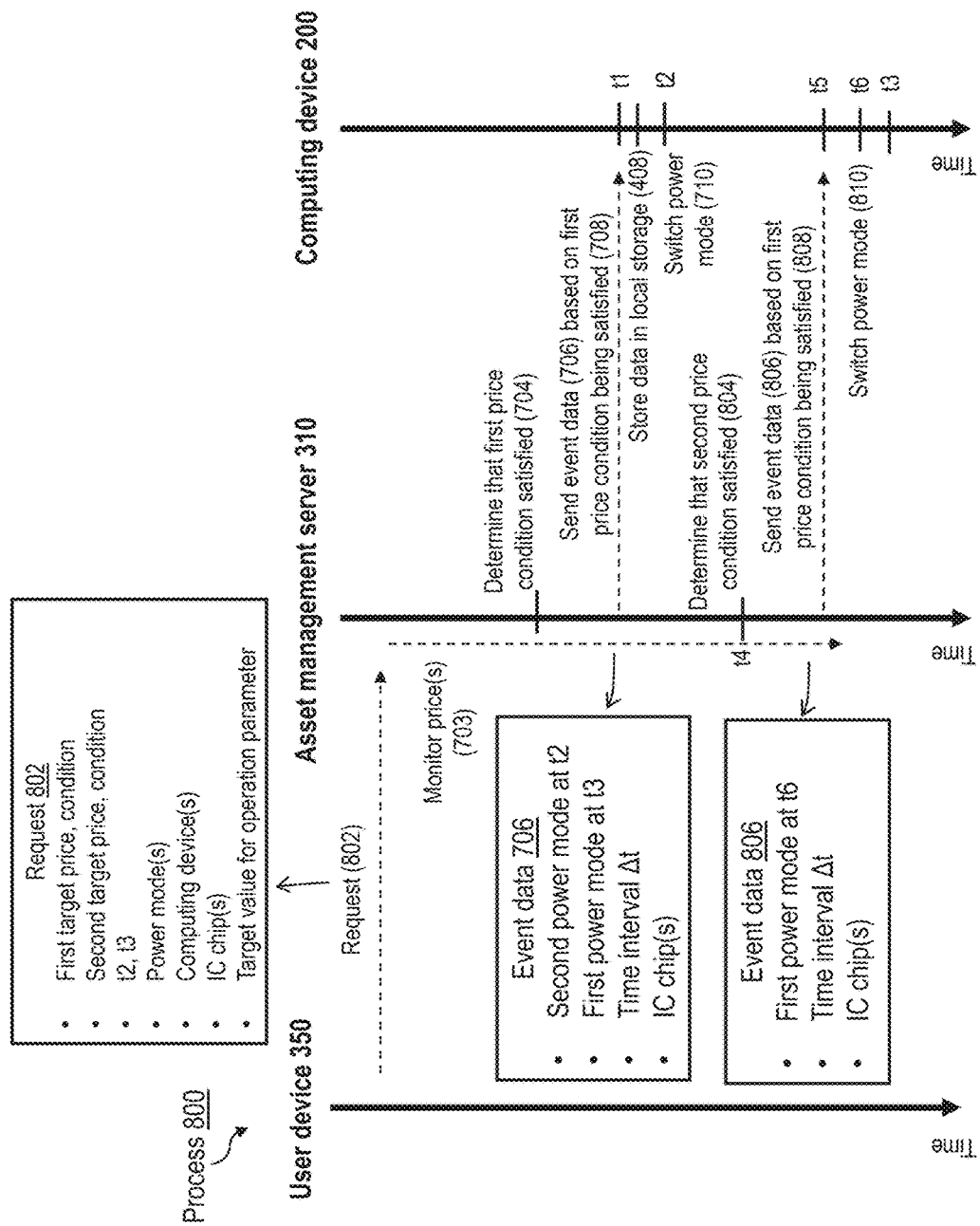
FIG. 8 is a diagram illustrating an example of a process of executing power events based on monitoring price.

FIG. 8 illustrates another example of a process 800 of executing power events based on monitoring price. As shown in FIG. 8, a request 802 from the user device 350 to the server 310 can include first and second target prices, which can be the same as or different from one another. The first and second target prices can be different target prices for the same price, such as an energy price in $/MWh. The request 802 can provide first and second conditions corresponding to the first and second target prices.

The first target price can correspond to the target price discussed with respect to FIG. 7, and operations 704, 708, 408, 710 can be performed based on a first price condition, corresponding to the first target price, being satisfied. For example, the first target price can be a first target energy price, and, when the monitored energy price goes above the first target energy price, the first price condition can be satisfied.

After the computing device 200 switches one or more IC chips 100 to the second power mode (710), the server 310 can continue monitoring one or more prices corresponding to the first and second target price. At a time t4 between t2 and t3 (where t3 is an optional scheduled time for the computing device 200 to switch back to the first power mode), the server 310 determines that a second price condition, corresponding to the second target price, is satisfied (804).

In some implementations, the first and second price conditions correspond to the same price. For example, the first price condition can be that a monitored price goes above (or below) the first target price, and the second price condition can be that the monitored price goes below (or above) the second target price, where the first and second target prices can be equal or different.

As an example of two price conditions, the first price condition can be that an energy price goes above a first target price p1, and the second price condition can be that the energy price goes below a second target price p2, where p1 is equal to or greater than p2. The first power mode can be a normal mode, and the second power mode can be a standby mode. When the energy price goes above p1, computation is cost-prohibitive, and the computing device 200 is switched to the standby mode. When the energy price goes below p2, computation is cost-effective, and the computing device 200 is switched back to the normal mode. Having p1 and p2 be different, with a gap in-between, can reduce a number of power events triggered based on small fluctuations in the monitored price, e.g., in scenarios in which the energy price may repeatedly go above and below p1 or p2.

Referring again to FIG. 8, based on determining that the second price condition is satisfied, the server 310 can send second event data 806 to the computing device 200 (808). The second event data 806 can instruct that the computing device 200 should switch to the first power mode at a time t6 that is before t3. The time t6 can constitute a start time for a second power event. The computing device 200 can receive the second event data 806 at time t5 (before or at t6) and switch one or more IC chips from the second power mode to the first power mode at time t6 (810). The computing device 200 can optionally locally store the second event data 806. As such, a power event can be rescheduled and executed dynamically responsive to monitoring of real-time price data.

Although not illustrated in FIG. 8, one or both power mode switches 710, 810 can be performed in a time range (e.g., randomly in the time range), as described in reference to FIG. 6.

Figure 9:
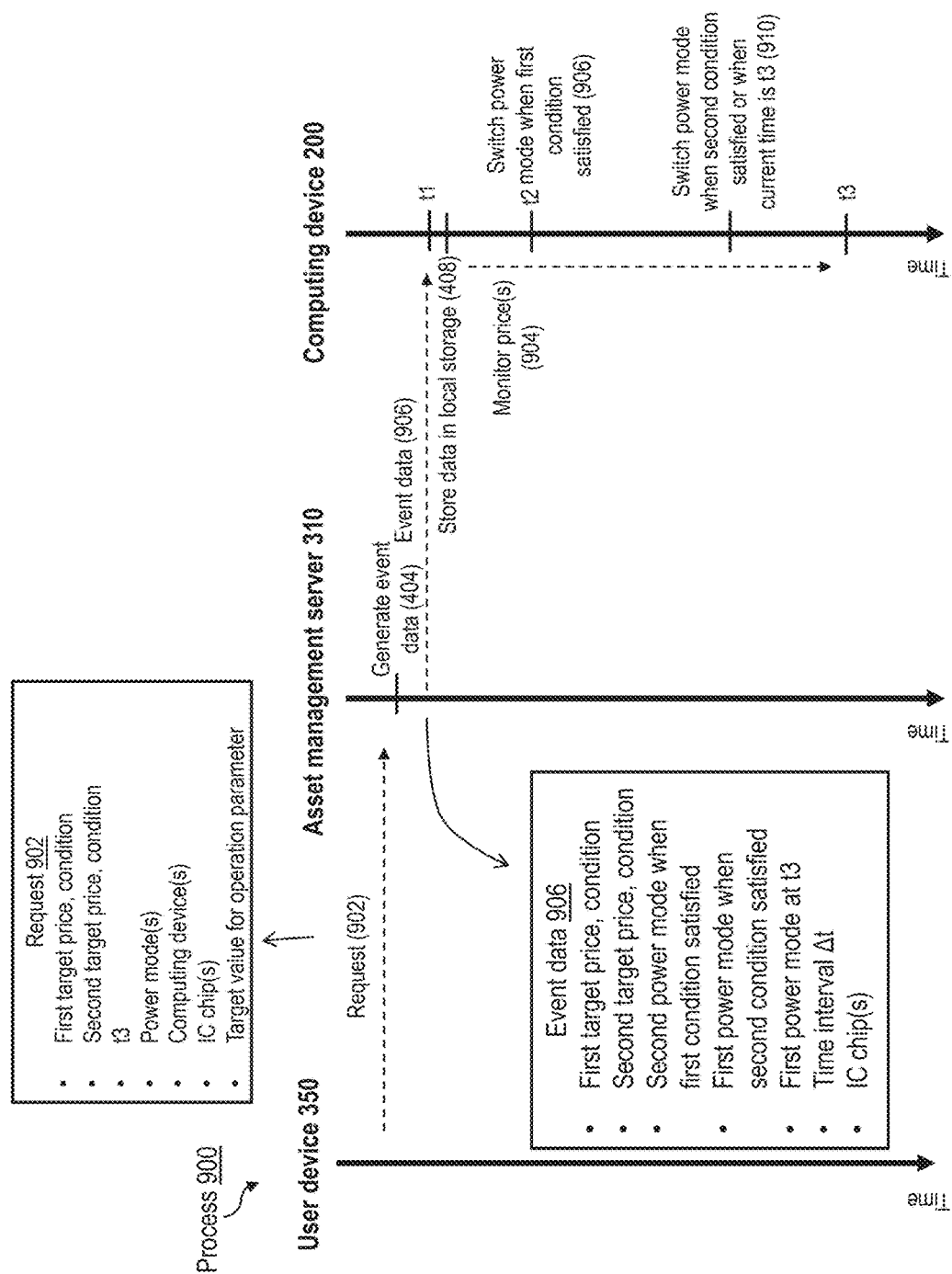
FIG. 9 is a diagram illustrating an example of a process including monitoring by a computing device for a power event.
Figure 10:
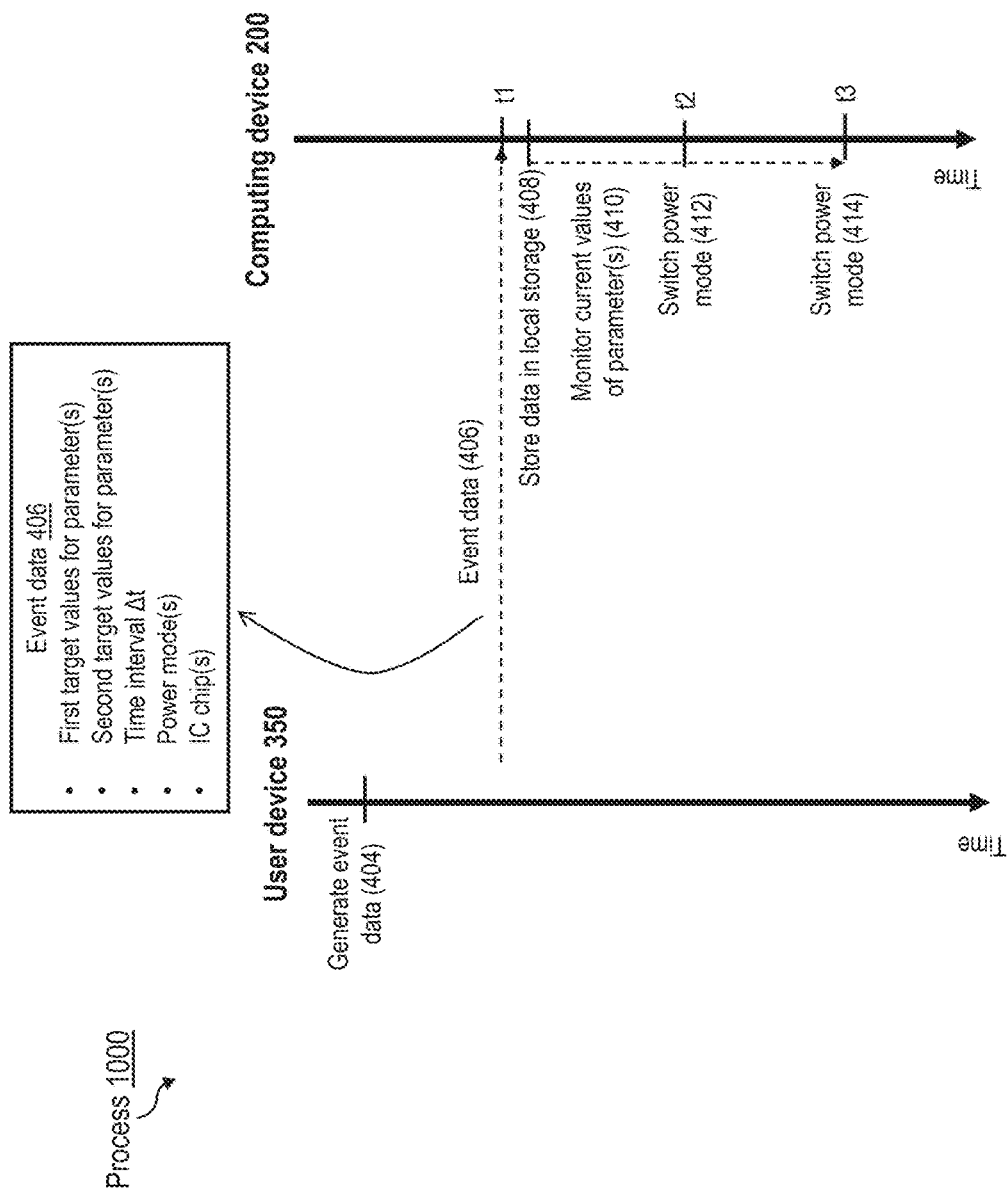
FIG. 10 is a diagram illustrating an example of a process for a power event.
Figure 11:
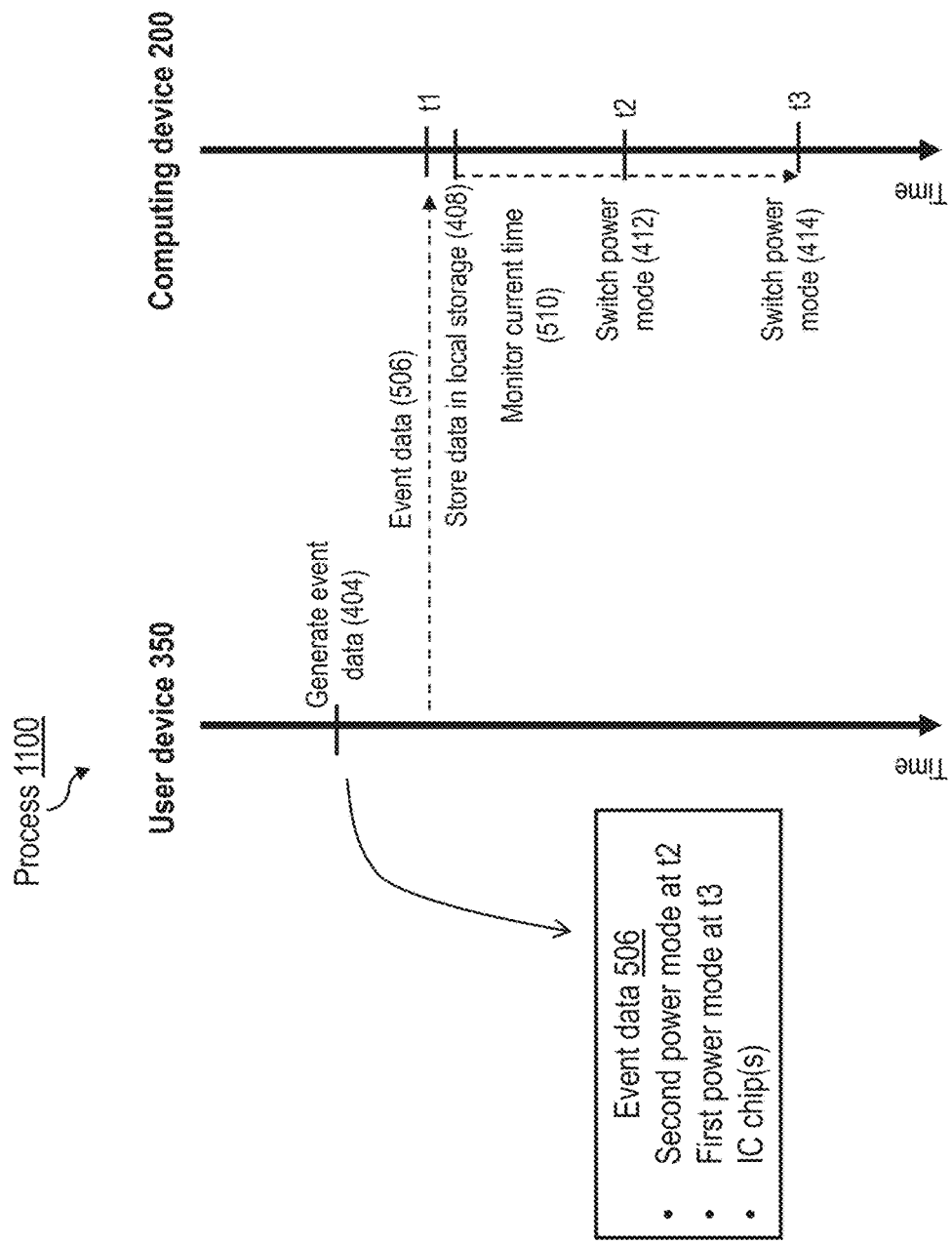
FIG. 11 is a diagram illustrating an example of a process including monitoring a current time for a power event.

In the examples of FIGS. 7-8, price monitoring is performed by the asset management server 310, which sends event data to the computing device 200 based on one or more price conditions being met. In some implementations, price monitoring is performed by the computing device 200. For example, FIG. 9 illustrates an example of a process for a power event, the process including monitoring by a computing device. As shown in FIG. 9, in a process 900, a request 902, which can be similar to the request 802 as shown, is received at the server 310 from the user device 350. The server 310 sends, to the computing device 200, event data 906 configured to facilitate the computing device 200 performing price monitoring and power control. For example, as shown in FIG. 9, the event data 906 can provide one or more target prices and one or more corresponding conditions, and power events to perform when the one or more conditions are satisfied. At least some of this data (e.g., the condition information) may not be included in the event data 906 when the server 310 performs monitoring. The computing device 200 can locally store the event data 906, or data thereof (408).

The computing device 200 monitors current price corresponding to the one or more target prices (904), e.g., by accessing the database 392 of the external data source 390. During monitoring, the computing device 200 can periodically determine whether a first condition, based on a first target price, has been satisfied. For example, the computing device 200 can monitor whether a first monitored current price has reached the first target price. The first and second conditions can be those described in reference to FIG. 8. When the first condition is satisfied, the computing device 200 can switch one or more of its IC chips 100 from a first power mode to a second power mode (906), as described in reference to FIGS. 4 to 8.

In some implementations, the computing device 200 can continue monitoring (904) and can periodically check whether the second condition has been satisfied. For example, the computing device 200 can monitor whether a price corresponding to the first target price and second target price has dropped from the first target price to the second target price, has risen from the first target price to the second target price, or has gone from above/below the first target price to below/above the first target price (in the case where the first and second target prices are the same). When the second condition is satisfied, the computing device 200 can switch the one or more IC chips 100 from the second power mode to the first power mode (910). In some implementations, when an end time t3 has been provided, the computing device 200 can monitor a current time and switch the one or more IC chips 100 from the second power mode to the first power mode when the current time reaches t3 (910). For example, the computing device 200 can switch the one or more IC chips 100 from the second power mode to the first power mode when either the second condition is satisfied or the current time reaches t3, whichever is first.

Although not illustrated in FIG. 9, one or both power mode switches 906, 910 can be performed in a time range (e.g., randomly in the time range), as described in reference to FIG. 6.

FIGS. 4 to 9 correspond to processes in which event data is sent from the server 310 to the computing device 200. However, in some implementations, a computing device 200 can receive event data from a user device 350, e.g., directly and/or without passing through the asset management server 310. For example, using a user interface 352, a user can use a management application 354 to sent event data to computing devices 200 by accessing API 342.

Processes 1000, 1100, 1200, 1300 of FIGS. 10 to 13 are examples of processes in which event data is sent from the user device 350 to the computing device 200. Processes 1000, 1100, 1200, 1300 can correspond to processes 400, 500, 600, 900 of FIGS. 4 to 6 and 9, respectively. Processes 1000, 1100, 1200, 1300 are different from processes 400, 500, 600, 900, respectively, in that the user device 350 generates event data (404) and sends the event to the computing device 200. Otherwise, the description provided for processes 400, 500, 600, 900 can apply equally to processes 1000, 1100, 1200, 1300.

Figure 12:
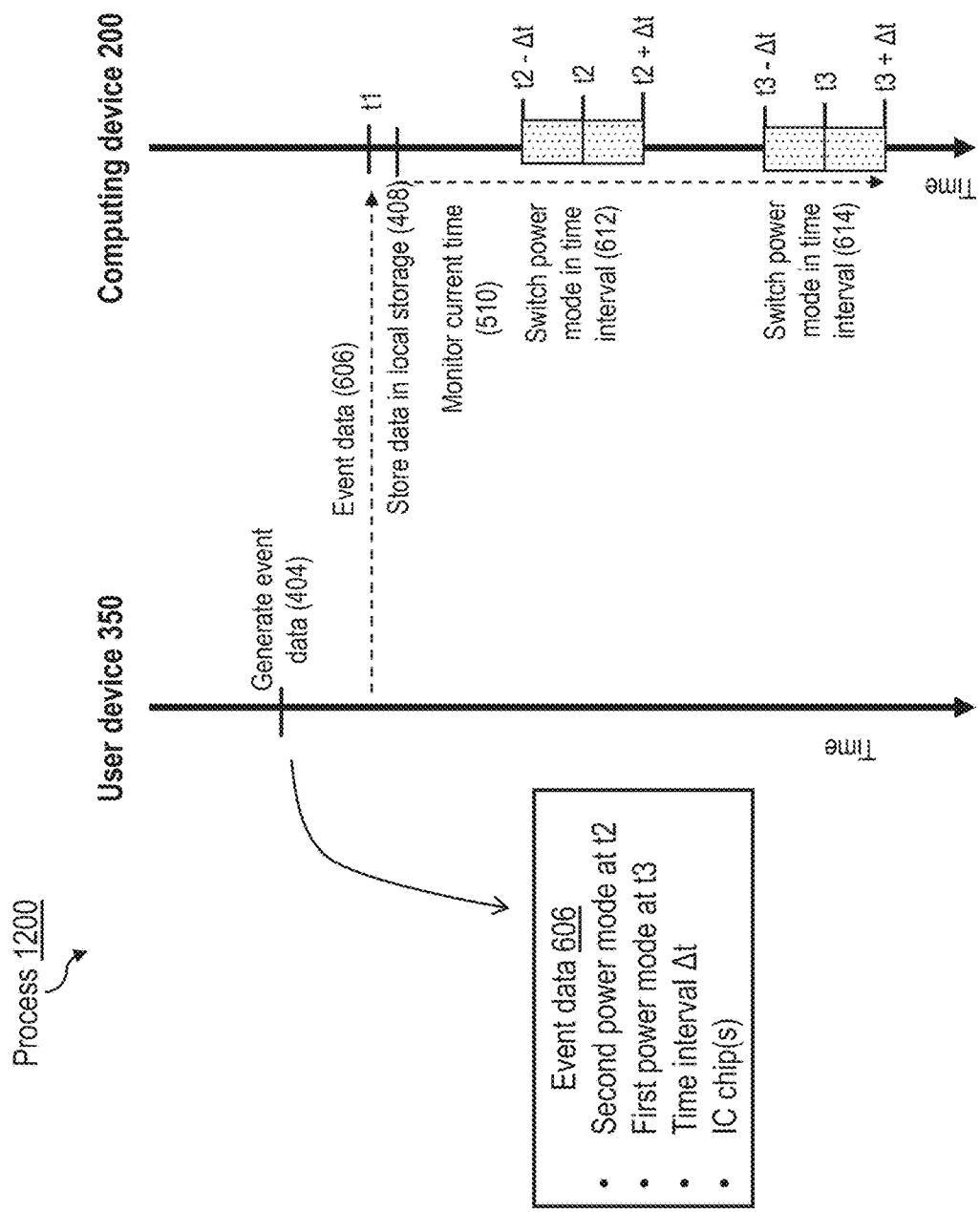
FIG. 12 is a diagram illustrating an example of a process including time intervals for a power mode switch.
Figure 13:
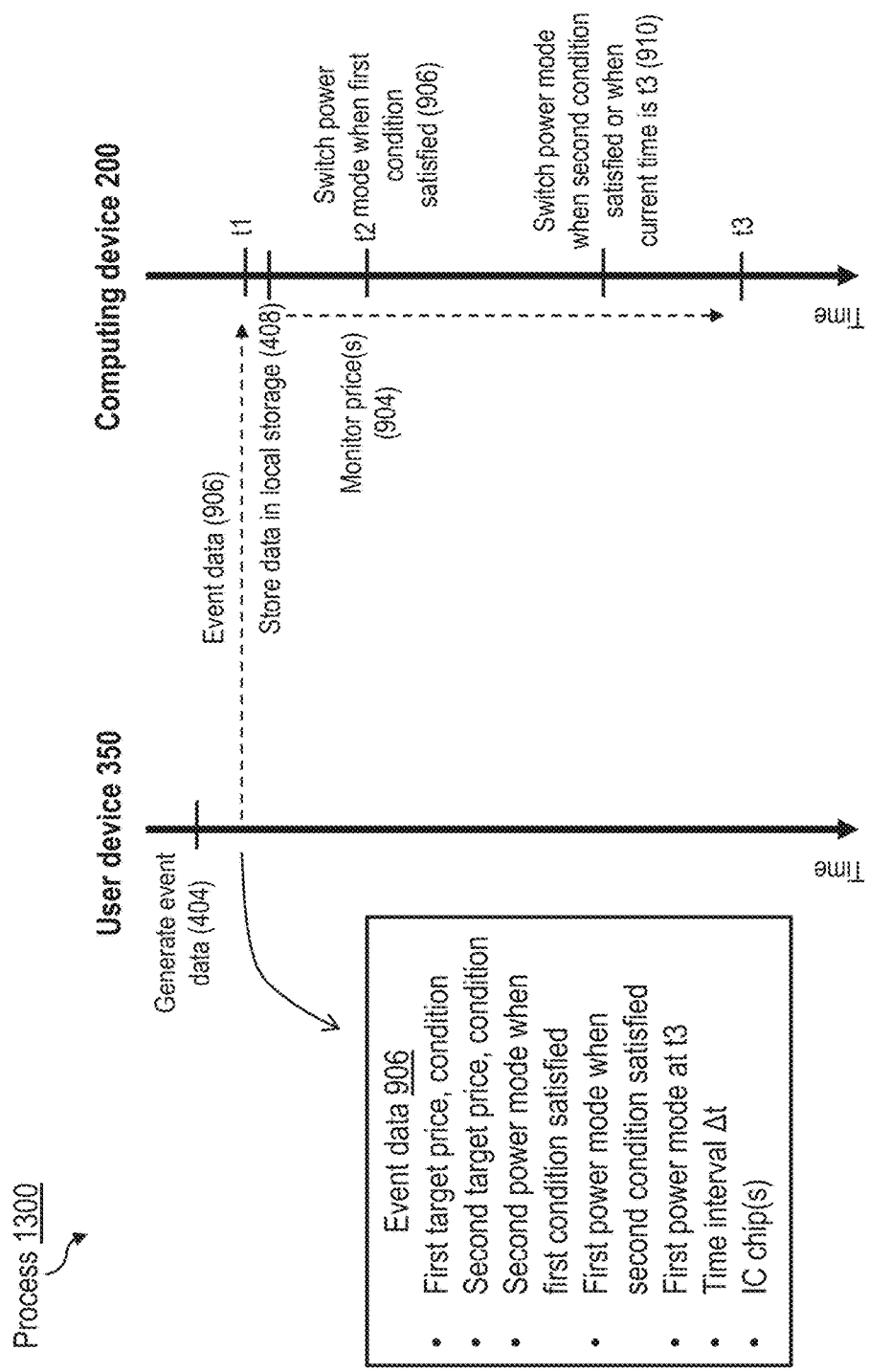
FIG. 13 is a diagram illustrating an example of a process of executing power events based on monitoring price.
Figure 14:
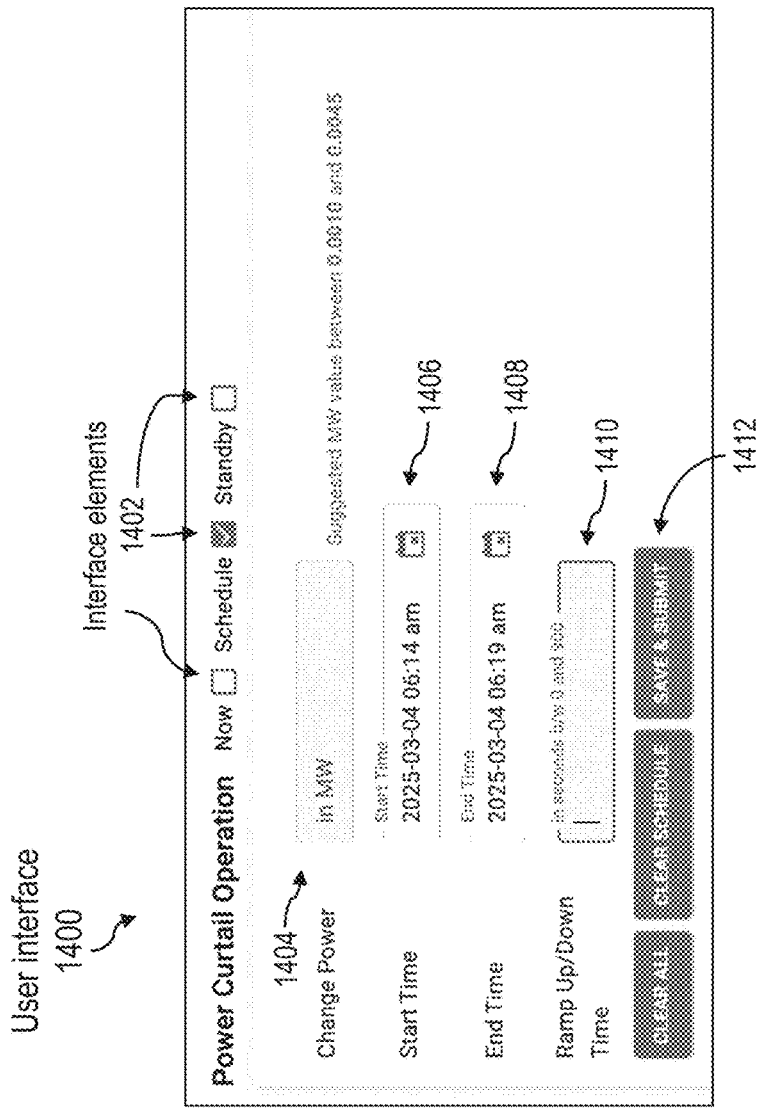
FIGS. 14 to 16 are examples of user interfaces for power event requests.
Figure 15:
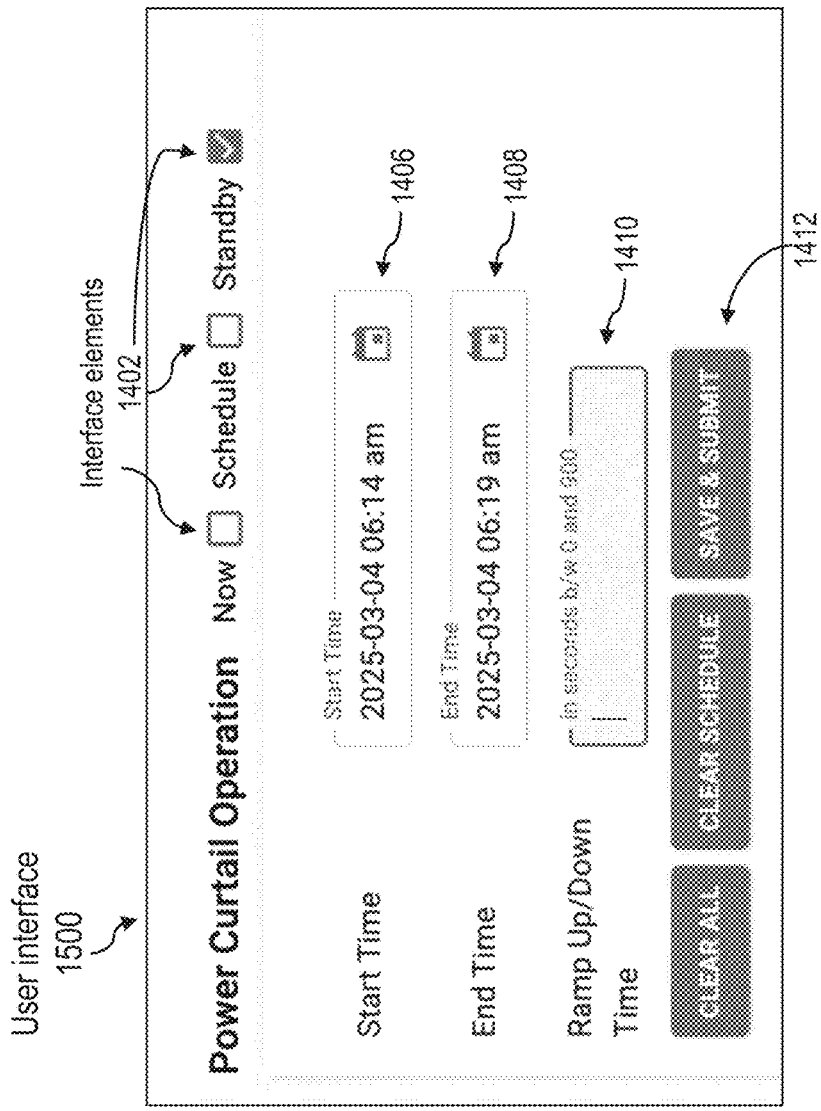
Figure 16:
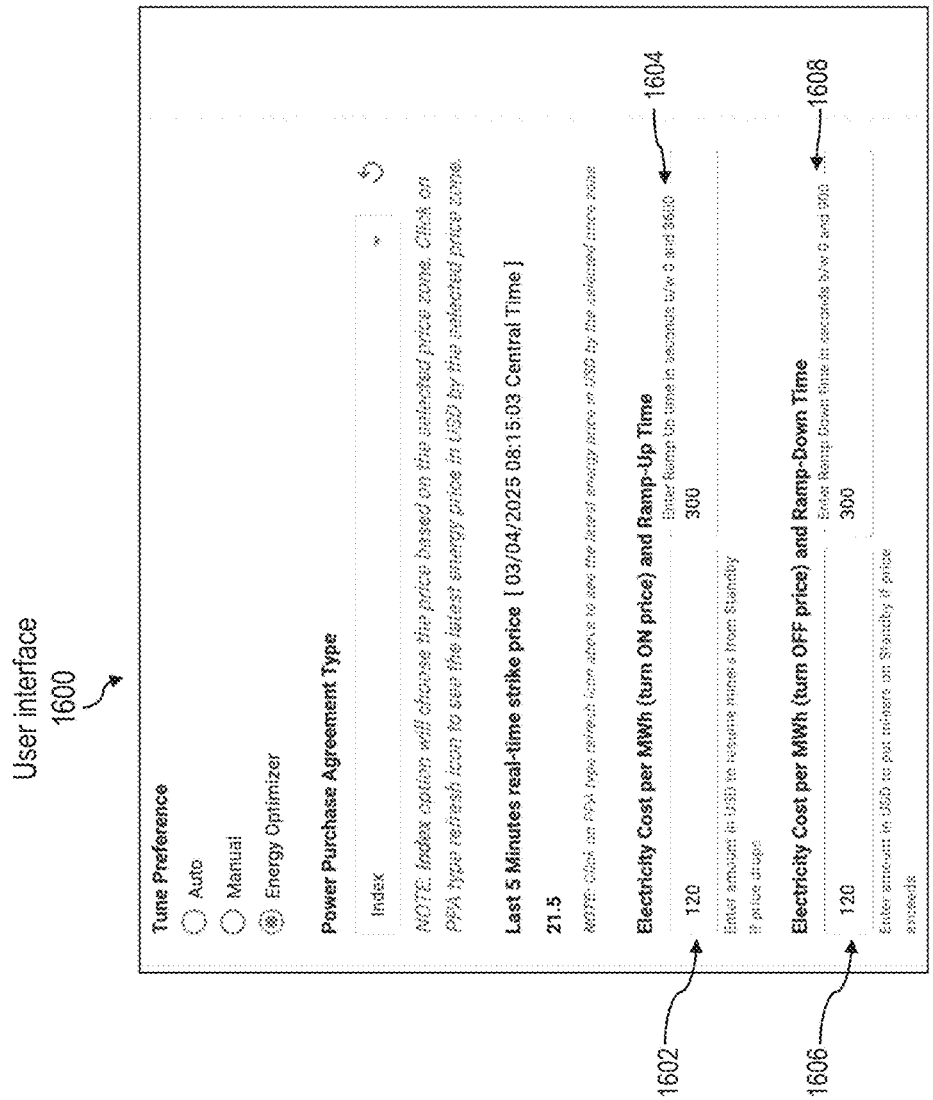

FIGS. 14-16 illustrate examples of user interfaces associated with the processes of FIGS. 4-13, e.g., user interfaces for power event requests. These user interfaces can be used to input information for generation of a request sent from a user device 350 to the asset management server 310, or for generation of event data by a user device 350. For example, these user interfaces can be presented as user interface 352, which may be a user interface of an internet browser, a user interface of a dedicated management application 354, and/or the like.

As shown in FIG. 14, a user interface 1400 can be used to instruct a "Power Curtail Operation," e.g., a power event in which one or more IC chips 100 of one or more computing devices 200 will switch from a first power mode associated with higher power consumption (e.g., a normal mode in which computation is performed) to a second power mode associated with lower power consumption (e.g., a standby mode in which computation is not performed). One of three interface elements 1402 can be selected to choose between a "Now" operation, a "Schedule" operation, and a "Standby" operation. In the "Now" operation, the power event should occur substantially immediately, e.g., with t2 substantially equal to t1 and/or substantially equal to a current time.

In the "Schedule" operation, the power event should occur substantially in the future, e.g., with t2 substantially later than t1 and/or substantially later than a current time. Further, the "Schedule" operation can optionally be associated with a "Change Power" value provided in an input field 1404. When a "Change Power" value is provided, computing device(s) 200 and/or IC chip(s) 100 that will perform the power event are determined so as to achieve a user-specified change in aggregate power consumption, as described in reference to the "target value for operation parameter" of FIG. 4. This determination can be performed, for example, by a user device 350 on which the user interface 1400 is displayed, or by a server 310 that receives a request sent by the user device 350 based on inputs provided in the user interface 1400.

In the "Standby" operation, the power event should occur substantially in the future, e.g., with t2 substantially later than t1 and/or substantially later than a current time.

The user interface 1400 further includes a "Start Time" field 1406 that can be used to input a start time t2 for the power event; an "End Time" field 1408 that can optionally be used to input an end time t3 for the power event (e.g., when computing devices 200 will revert to their initial power mode); and a "Ramp Up/Down Time" field 1410 that can optionally be used to input an interval Δt over which power mode switches for multiple computing devices 200 will be distributed, as shown in FIGS. 6 and 12 and as applicable to each of FIGS. 4 to 13. A "Save & Submit" interface element 1412 can be used to trigger transmission of a corresponding request to a server 310 (in cases in which event data is generated and sent by the server 310) or trigger transmission of event data to one or more computing devices 200 (in cases in which event data is sent by the user device 350).

FIG. 15 illustrates an example of a user interface 1500 corresponding to the "Standby" operation. The user interface 1500 is identical to the user interface 1500, except that the input field 1404 has been removed. A power event configured by the user interface 1500 may be applied to an entire group of computing devices 200, e.g., without being based on a target change in power consumption.

FIG. 16 illustrates an example of a user interface 1600 that can be used to configure power events based on a price condition, as illustrated in FIGS. 7-9 and 13. Using input field 1602, a user may enter a first target power price. When a monitored price goes below this value, a power mode switch from a standby mode to a normal mode can be initiated, corresponding, in this example, to a resumption in cryptocurrency mining. A corresponding input field 1604 permits entry of a time interval Δt1 over which the power mode switch is performed for multiple computing devices 200. Using input field 1606, a user may enter a second target power price. When a monitored price goes above this value, a power mode switch from a normal mode to a standby mode can be initiated, corresponding, in this example, to a pause in cryptocurrency mining. A corresponding input field 1608 permits entry of a time interval Δt2 over which the power mode switch is performed for multiple computing devices 200.

The two target prices of FIG. 16 can correspond to the first and second target prices (and corresponding conditions) of FIGS. 8-9 and 13. Further, the two target prices may be set to the same value, effectively corresponding to the process 700 of FIG. 7.

In some implementations, an external entity (sometimes referred to as a "qualified scheduling entity") can be designated to provide requests and/or event data to configure power events. For example, a user or entity that manages a group of computing devices 200 may elect to designate a third-party entity, such as a virtual power plant operator, utilities manager, financial institution, and/or the like, to determine what power events to schedule for the computing devices 200.

Figure 17:
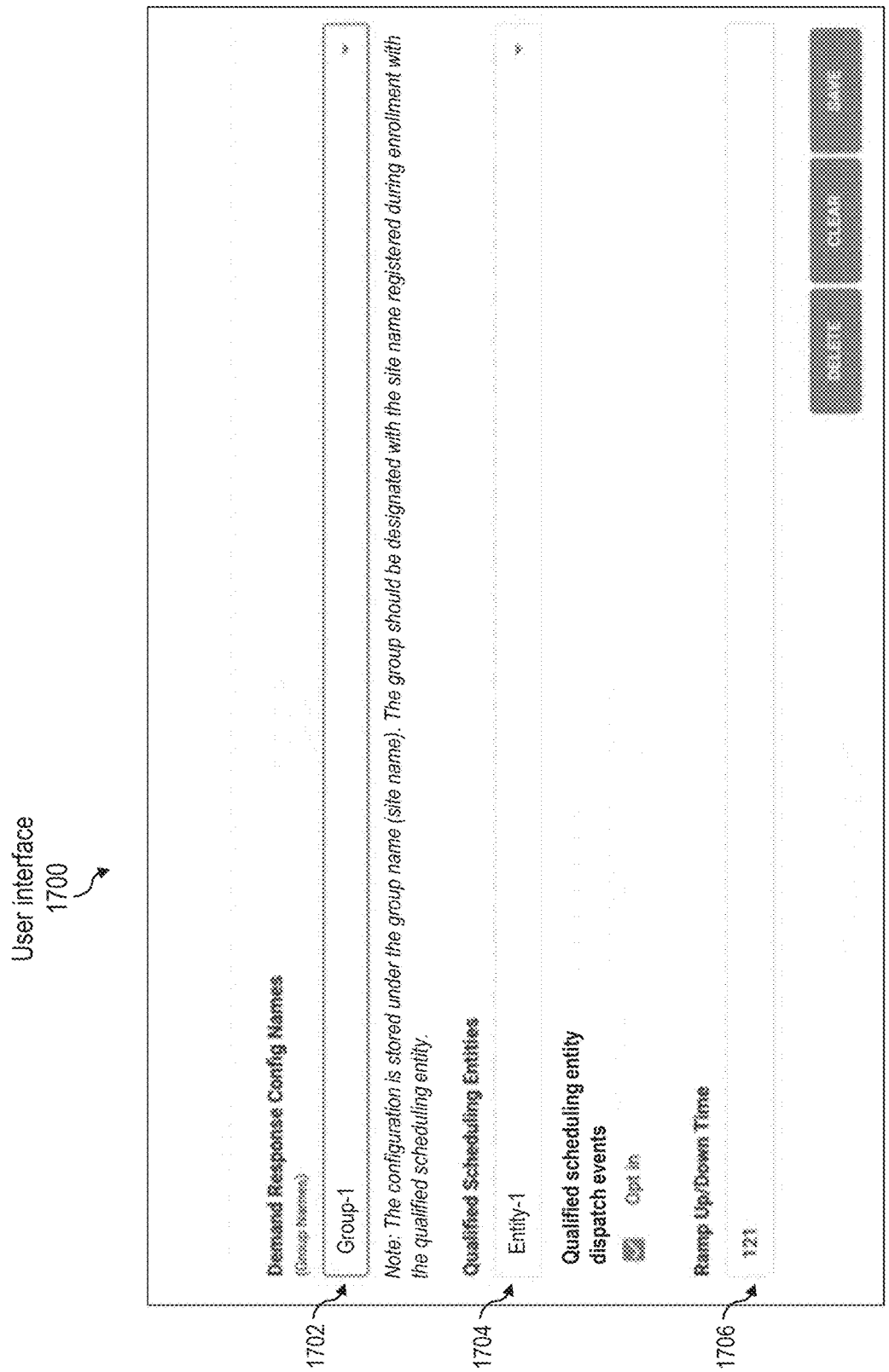
FIG. 17 is an example of a user interface for third-party entity designation.

FIG. 17 illustrates an example of a user interface 1700 associated with third-party management, e.g., for third-party entity designation. The user interface 1700 includes an input field 1702 in which a user (for example, using the user device 350) may designate a group of computing devices 200 for control by the third party. For example, "Group-1" as shown in FIG. 17 may be a name associated with a group of computing devices 200. Input field 1704 may be used to designate the third party (in this case, "Entity-1") to be provided control. Input field 1706 may be used to input a time interval Δt over which power events controlled by the third party may be distributed, as discussed in reference to FIGS. 4 to 13.

Figure 18:
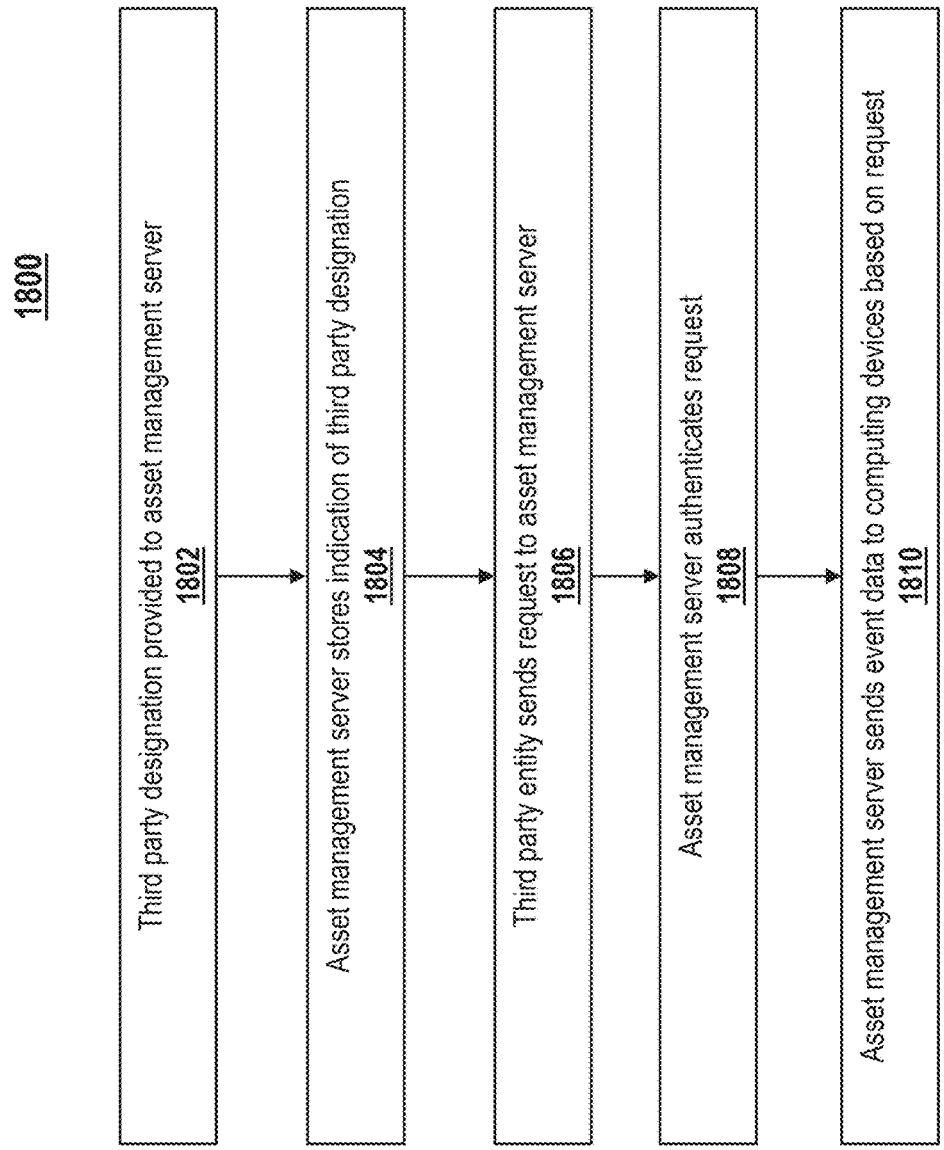
FIG. 18 is a diagram illustrating an example of a process for third-party entity designation.

Based on designation of a third party, the third party can initiate power events, e.g., any of the power events discussed with respect to FIGS. 4 to 9. For example, FIG. 18 illustrates an example of a process for third-party entity designation. As shown in FIG. 18, a process 1800 can include providing a third party designation to the asset management server 310 (1802). For example, user device 350 can use API 340 to provide, to the server 310, a designation as discussed with respect to FIG. 17. The designation can indicate a third-party entity 380. The designation can indicate one or more computing devices 200 that the third-party entity 380 is permitted to control. Accordingly, the server 310 can store a designation of the third-party entity 380 (1804). The stored designation can include an identifier, password, and/or other data usable to authenticate requests as being from the third-party entity 380.

Subsequently, the third party-entity 380 can send a request to the asset management server 310 (1806). The request can have the characteristics described for the requests of any of FIGS. 4 to 9, e.g., the third-party entity 380 can substitute for the user device 350 in sending the requests.

The server 310 authenticates the request as being from the designated third-party entity 380 (1808) and, based on the request being designated, the server 310 sends event data to one or more computing devices 200 based on the request (1810). For example, the server 310 can use the stored designation to determine that the received request was authentically provided by the third-party entity 380. Based on the authentication of the request, the server 310 can perform operations based on the request as described for any of FIGS. 4 to 9. For example, the resulting operations of the server 310 and computing device(s) 200 receiving event data from the server 310 can be identical to those described with respect to FIGS. 4 to 9, except that the initiating request was received from a previously-designated third-party entity 380. The computing device(s) 200 that receive the event data can be computing device(s) indicated as being controllable by the third-party entity 380 in the previously-provided designation, e.g., computing device(s) in the group "Group-1" of FIG. 17.

FIG. 19 illustrates an example of a process 1900 for a power event, e.g., a process 1900 associated with phased execution of power events. The process 1900 can be performed, for example, by a computing device 200 executing any of the processes of FIGS. 4 to 13. For example, any process described herein in which a computing device 200 switches its power mode (including switching a power mode of one or more IC chips 100 of the computing device 200) can include performing the process 1900. Operations of the process 1900 can be performed as described for the corresponding operations of FIGS. 4 to 13.

The process 1900 includes receiving, by a computing device, event data providing a target time of a power event, and a time interval (1902). For example, the target time can be a start time t2 or t6, or an end time t3. The event data can be any of the event data of FIGS. 4 to 13, and the time interval can be a time interval Δt as discussed with respect to FIGS. 4 to 13.

The computing device determines a random time within a time range, the time range based on the target time and the time interval (1904). For example, the time range can be within the time interval of the target time. For example, in some implementations, the time range is [target_time−Δt, target_time] or [target_time, target_time+Δt]. The random time can be determined using any suitable randomization method, e.g., as described with respect to FIG. 6. In some implementations, the computing device receives the random time, e.g., from asset management server 310.

The computing device determines that a current time has reached the target time (1906), e.g., based on tracking of the current time by the computing device. "Reached the target time" can include reaching a predetermined time with respect to the target time, e.g., reaching the time t=target_time−Δt.

Based on the current time reaching the target time, the computing device switches from a first power mode (e.g., normal or standby) to a second power mode (e.g., standby or normal) at the random time (1908).

When this operation is performed by multiple computing devices, the result is effective time distribution of power mode switching, because the determined "random time" will be different or substantially different for each computing device. As a result, power surges can be avoided or mitigated. Further, in some implementations, the random time is determined locally by each computing device (e.g., based on a locally-generated random number), such that centralized coordination of the random times of multiple computing devices is not necessary.

Figure 20:
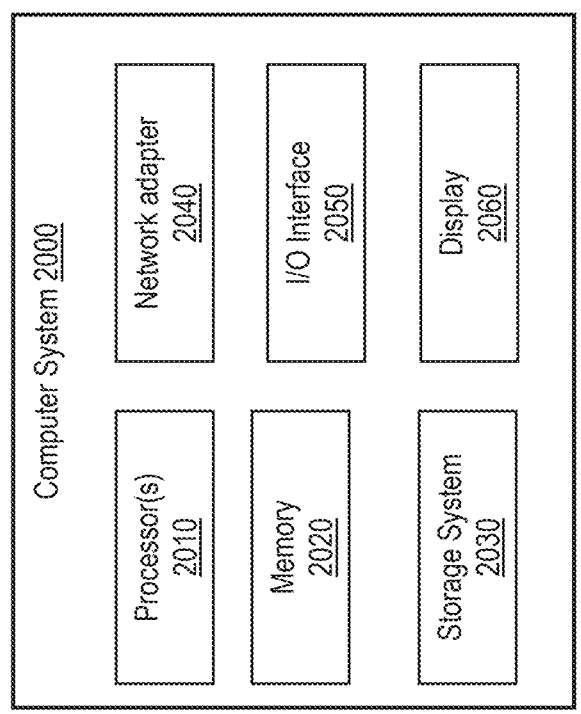
FIG. 20 is a diagram illustrating an example of a computer system.

FIG. 20 is a block diagram illustrating a computer system 2000. In some implementations, the controller 120, the user device 350, the asset management server 310, or the computing device 200 (e.g., controller 204) includes, is similar to, or is associated with, a computer system such as the computer system 2000. The computer system 2000 can be configured to perform operations described herein as being performed by any of the controller 120, the user device 350, the asset management server 310, or the computing device 200.

The computer system 2000 may refer to any system including a general purpose or special purpose computing system. For example, the computer system 2000 may include a personal computer, a server computer, a cloud computing system, a laptop computer, a home appliance, and the like. As shown in FIG. 20, the computer system 2000 may include at least one processor 2010, a memory 2020, a storage system 2030, a network adapter 2040, an input/output (I/O) interface 2050, and a display 2060.

The at least one processor 2010 may execute a program module including computer system executable instructions. The program module may include routines, programs, objects, components, logic, data structures, and the like, performing a specific task or implementing a specific abstract data type. The memory 2020 may include a computer system readable, non-transitory medium in the form of a volatile memory such as a random access memory (RAM). The at least one processor 2010 may access the memory 2020 and execute instructions loaded in the memory 2020. The storage system 2030 may non-volatilely store information and may include at least one program product including a program module configured to perform the operations described herein for any of the controller 120, the user device 350, the asset management server 310, or the computing device 200.

The network adapter 2040 may provide a connection to a local area network (LAN), a wide area network (WAN), and/or a public network (e.g., the Internet), etc. The I/O interface 2050 may provide a communication channel with a peripheral device such as a keyboard, a pointing device, and an audio system. The display 2060 may output various pieces of information so that the user may check the information.

In some implementations, operations described above with respect to FIGS. 4 to 13, 18, and/or 19 are implemented as or using a computer program product. The computer program product may include a non-transitory computer-readable medium (or storage medium) including computer-readable program instructions for causing the at least one processor 2010 to perform the disclosed operations. Computer readable instructions may be, but are not limited to, assembler instructions, instruction set architecture (ISA) instructions, machine instructions, machine dependent instructions, microcode, firmware instructions, state setup data, or source code or object code written in at least one programming language.

The computer-readable medium may be any type of medium capable of non-transitorily holding and storing instructions executed by the at least one processor 2010 or any instruction executable device. The computer-readable medium may be an electronic storage device, a magnetic storage device, an optical storage device, an electromagnetic storage device, a semiconductor storage device, or any combination thereof, but is not limited thereto. For example, the computer readable medium may be a portable computer diskette, a hard disk, a random access memory (RAM), a read-only memory (ROM), an electrically erasable read only memory (EEPROM), a flash memory, a static random access memory (SRAM), a compact disc (CD), a digital versatile disc (DVD), a memory stick, a floppy disk, a mechanically encoded device such as a punch card, or any combination thereof.

A number of implementations have been described. Nevertheless, it will be understood that various modifications may be made. While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. A system comprising:
a plurality of computing devices, wherein each of the plurality of computing devices comprises a plurality of integrated circuit (IC) chips configured to perform a common type of computation in parallel with one another,
wherein at least one of the plurality of computing devices is configured to:
receive, from an asset management server, an event data providing target values for one or more parameters to schedule a power event;
store the event data in a storage coupled to the computing device;
monitor one or more current values for the one or more parameters; and
based on determining that the current values for the one or more parameters have reached the target values, switch one or more of the plurality of IC chips corresponding to the computing device from a first power mode to a second power mode.

2. The system of claim 1, wherein the target values of the one or more parameters comprise a target time of the power event and a time interval, and wherein the at least one computing device is configured to initiate the switch from the first power mode to the second power mode by:
determining a random time within a time range, wherein the time range is based on the target time and the time interval;
determining that a current time has reached the target time of the power event; and
based on the current time reaching the target time, switching from the first power mode to the second power mode at the random time.

3. The system of claim 2, wherein the at least one of the plurality of computing devices comprise multiple computing devices, and
wherein the multiple computing devices are configured to determine respective random times that are different from one another.

4. The system of claim 2, wherein determining that the current time has reached the target time comprises determining that the current time is the time interval before the target time, and
wherein the random time within the time range is before the target time.

5. The system of claim 2, wherein the random time within the time range is after the target time.

6. The system of claim 1, wherein the target values of the one or more parameters comprise a start time of the power event and an end time of the power event, wherein the end time is after the start time,
wherein the at least one computing device is configured to:
initiate the switch from the first power mode to the second power mode based on a current time reaching the start time, and
initiate a switch from the second power mode to the first power mode based on the current time reaching the end time.

7. The system of claim 1, wherein the target values of the one or more parameters comprise a target energy price, and wherein the at least one computing device is configured to initiate the switch from the first power mode to the second power mode by:
    monitoring an energy price;
    determining that the energy price has reached the target energy price; and
    based on determining that the energy price has reached the target energy price, switching from the first power mode to the second power mode.

8. The system of claim 1, comprising the asset management server, wherein the asset management server is configured to control operations of the plurality of computing devices, and wherein the asset management server is configured to:
    receive a request to schedule the power event, wherein the request provides the target values for the one or more parameters, and
    based on the request, generate the event data and send the event data to the at least one computing device.

9. The system of claim 8, wherein the target values of the one or more parameters comprise a target energy price, wherein the asset management server is configured to:
    monitor an energy price;
    determine that the energy price has reached the target energy price; and
    in response to determining that the energy price has reached the target energy price, generate the event data and send the event data to the at least one computing device.

10. The system of claim 8, wherein the request provides a condition for switching the at least one computing device from the first power mode to the second power mode,
    wherein the event data provides a first end time at which the at least one computing device is to switch from the second power mode to the first power mode, and
    wherein the asset management server is configured to:
    at a time after the event data is sent to the at least one computing device, and before the first end time, determine that the condition remains satisfied; and
    based on determining that the condition remains satisfied, send an update to the at least one computing device, the update configured to change the first end time to a second end time that is after the first end time.

11. The system of claim 8, wherein the asset management server is configured to:
    receive, from a user device, a designation of a third-party entity as permitted to control the at least one computing device; and
    in response to receiving the request, authenticate whether the request is received from the third-party entity,
    wherein generating the event data and sending the event data to the at least one computing device is in response to authenticating that the request is received from the third-party entity.

12. The system of claim 1, wherein, in the first power mode, the common type of computation is enabled, and
    wherein, in the second power mode, the common type of computation is disabled.

13. The system of claim 12, wherein, in the second power mode, a communication function of the computing device is enabled, wherein the communication function is configured to provide communication between the computing device and the asset management server.

14. The system of claim 1, wherein the first power mode corresponds to a power-on state and the second power mode corresponds to a power-off state, and wherein switching from the first power mode to the second power mode comprises switching the one or more IC chips of the computing device from the power-on state to the power-off state.

15. The system of claim 1, wherein the common type of computation comprises a cryptocurrency mining computation or a machine learning computation.

16. A method, comprising:
    controlling a plurality of integrated circuit (IC) chips of a computing device in a first power mode, to perform a common type of computation in parallel with one another;
    receiving, at the computing device, an event data providing target values for one or more parameters to schedule a power event, wherein the event data is received from an asset management server or from a user device;
    storing the event data in a storage coupled to the computing device;
    monitoring, by the computing device, current values for the one or more parameters; and
    based on determining that the current values for the one or more parameters have reached the target values, switching one or more of the plurality of IC chips corresponding to the computing device from the first power mode to a second power mode, wherein switching the one or more IC chips from the first power mode to the second power mode comprises terminating performance of the common type of computation by the one or more IC chips.

17. The method of claim 16, wherein the target values of the one or more parameters comprise a target time of the power event and a time interval, and wherein the method comprises initiating the switch from the first power mode to the second power mode by:
    determining a random time within a time range, wherein the time range is based on the target time and the time interval;
    determining that a current time has reached the target time of the power event; and
    based on the current time reaching the target time, switching from the first power mode to the second power mode at the random time.

18. A system comprising:
    a plurality of computing devices, wherein each of the plurality of computing devices comprises a plurality of integrated circuit (IC) chips configured to perform a common type of computation in parallel with one another; and
    an asset management server configured to control operations of the plurality of computing devices,
    wherein the asset management server is configured to:
    receive a request to schedule a power event, wherein the request provides target values for one or more parameters, and
    based on the request, generate event data and send the event data to at least one of the plurality of computing devices, and
    wherein the at least one computing device is configured to:
    receive the event data from the asset management server,
    store the event data in a storage coupled to the computing device, and
    based on determining that current values for the one or more parameters have reached the target values, switch one or more of the plurality of IC chips corresponding to the computing device from a first power mode to a second power mode.

19. The system of claim 18, wherein the target values comprise a target time for the power event,
   wherein the request provides the target time, and
   wherein the at least one computing device is configured to:
   monitor a current time, and
   switch the one or more of the plurality of IC chips from the first power mode to the second power mode in response to the current time reaching the target time.

20. The system of claim 18, wherein the target values comprise a target energy price, and wherein the asset management server is configured to:
   monitor an energy price;
   determine that the energy price has reached the target energy price; and
   in response to determining that the energy price has reached the target energy price, generate the event data and send the event data to the at least one computing device.

\* \* \* \* \*